United States Patent [19]

Boden et al.

[11] Patent Number: 4,481,225
[45] Date of Patent: Nov. 6, 1984

[54] FLAVORING WITH A 1-HYDROXYMETHYL-2-ACYL CYCLOPROPANE DERIVATIVE

[75] Inventors: Richard M. Boden, Ocean; Marie R. Hanna, Hazlet; Theodore J. Tyszkiewicz, Sayreville, all of N.J.

[73] Assignee: International Flavors & Fragrances Inc., New York, N.Y.

[21] Appl. No.: 556,694

[22] Filed: Nov. 30, 1983

Related U.S. Application Data

[62] Division of Ser. No. 422,486, Sep. 23, 1982, Pat. No. 4,435,428.

[51] Int. Cl.³ .................. A23L 1/226; A23L 1/235
[52] U.S. Cl. ............................. 426/538; 426/536; 568/303
[58] Field of Search ............... 426/538; 568/303

[56] References Cited

U.S. PATENT DOCUMENTS 4,435,428  3/1984  Boden et al. .................. 426/538 X Primary Examiner—Joseph M. Golian
Attorney, Agent, or Firm—Arthur L. Liberman

[57] ABSTRACT

Described is the use of the compound having the structure:

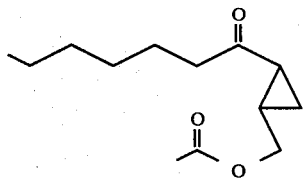

in augmenting or enhancing the aroma or taste of foodstuffs.

1 Claim, 12 Drawing Figures

GLC PROFILE FOR EXAMPLE I.

GLC PROFILE FOR EXAMPLE I.

GLC PROFILE FOR EXAMPLE II.

GLC PROFILE FOR EXAMPLE III.

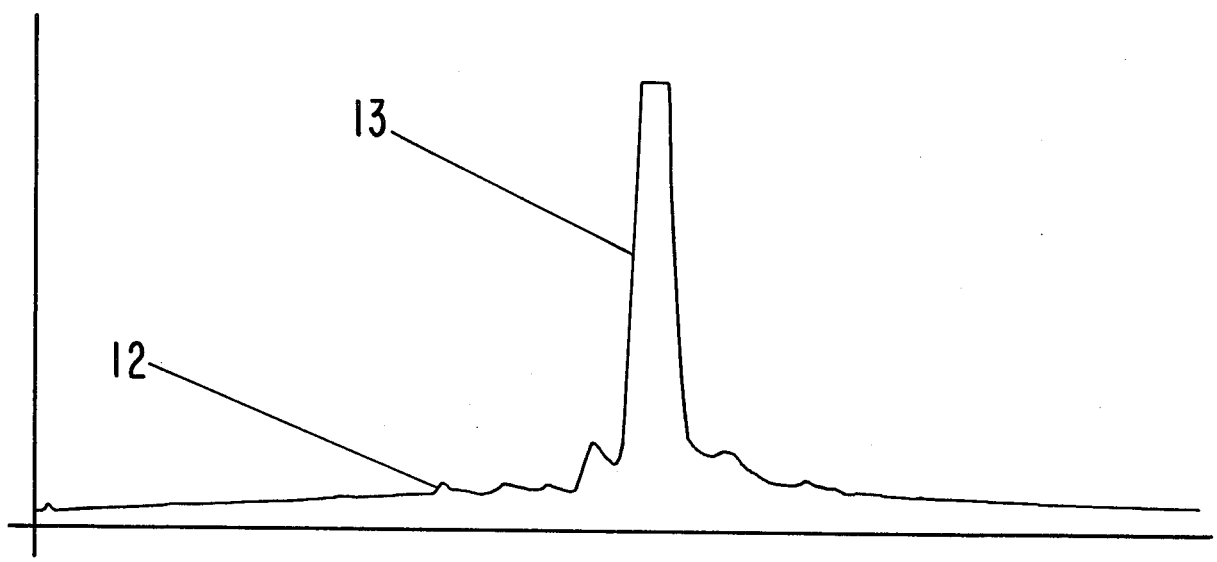
FIG.IA
GLC PROFILE FOR EXAMPLE I.

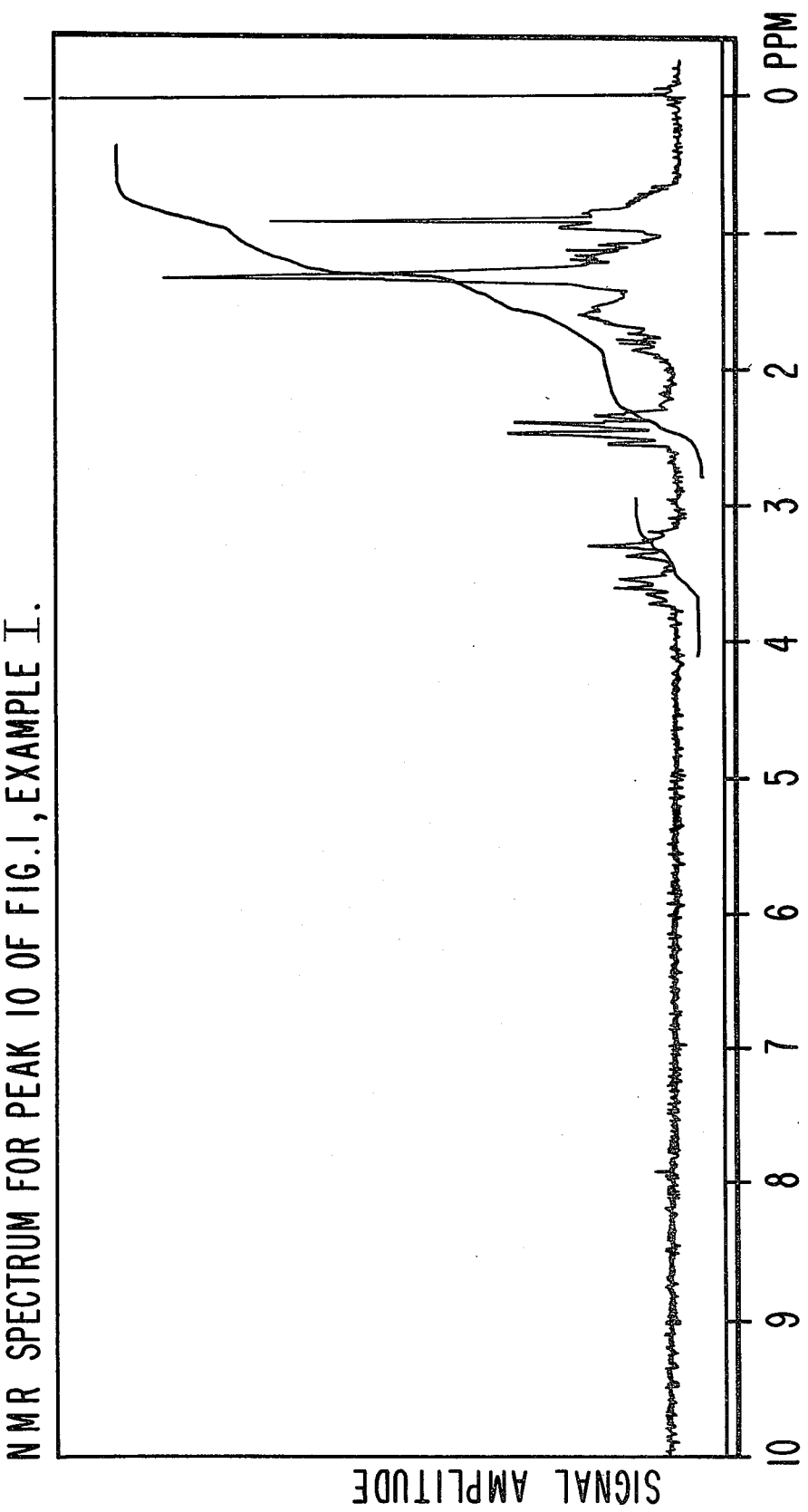

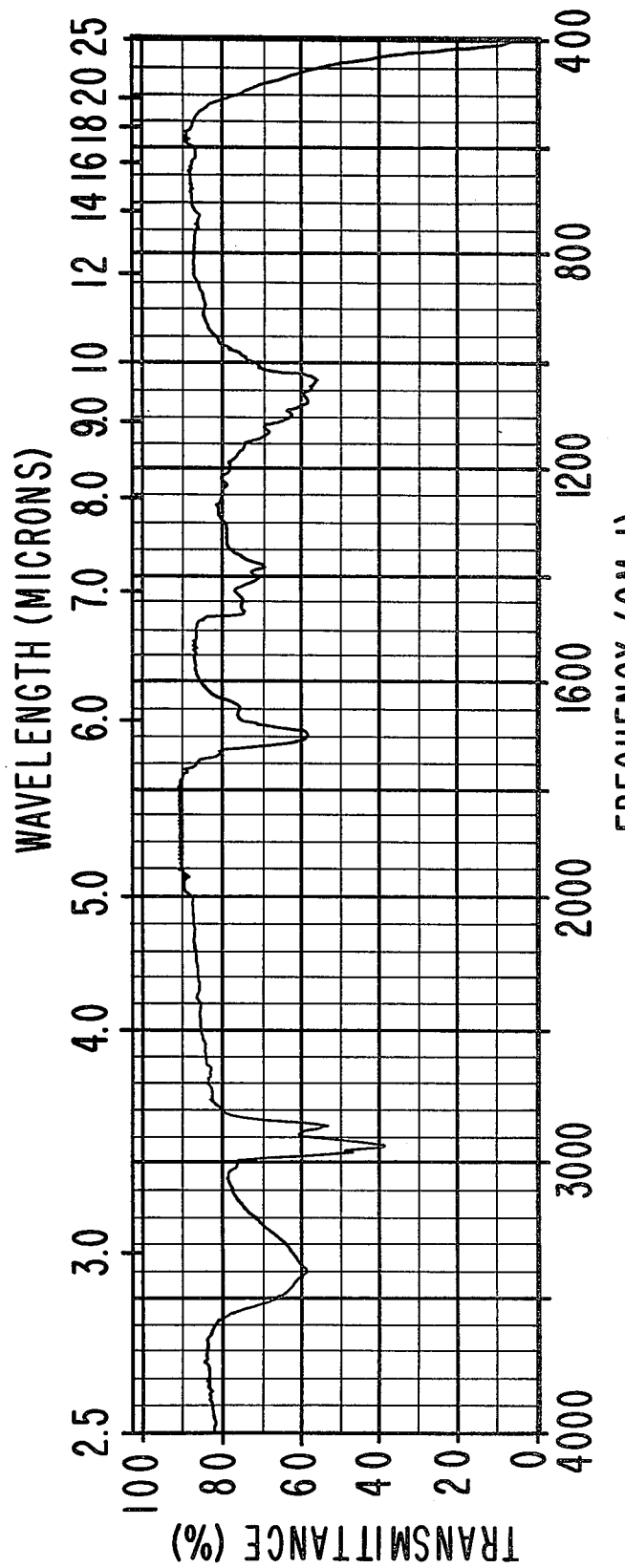

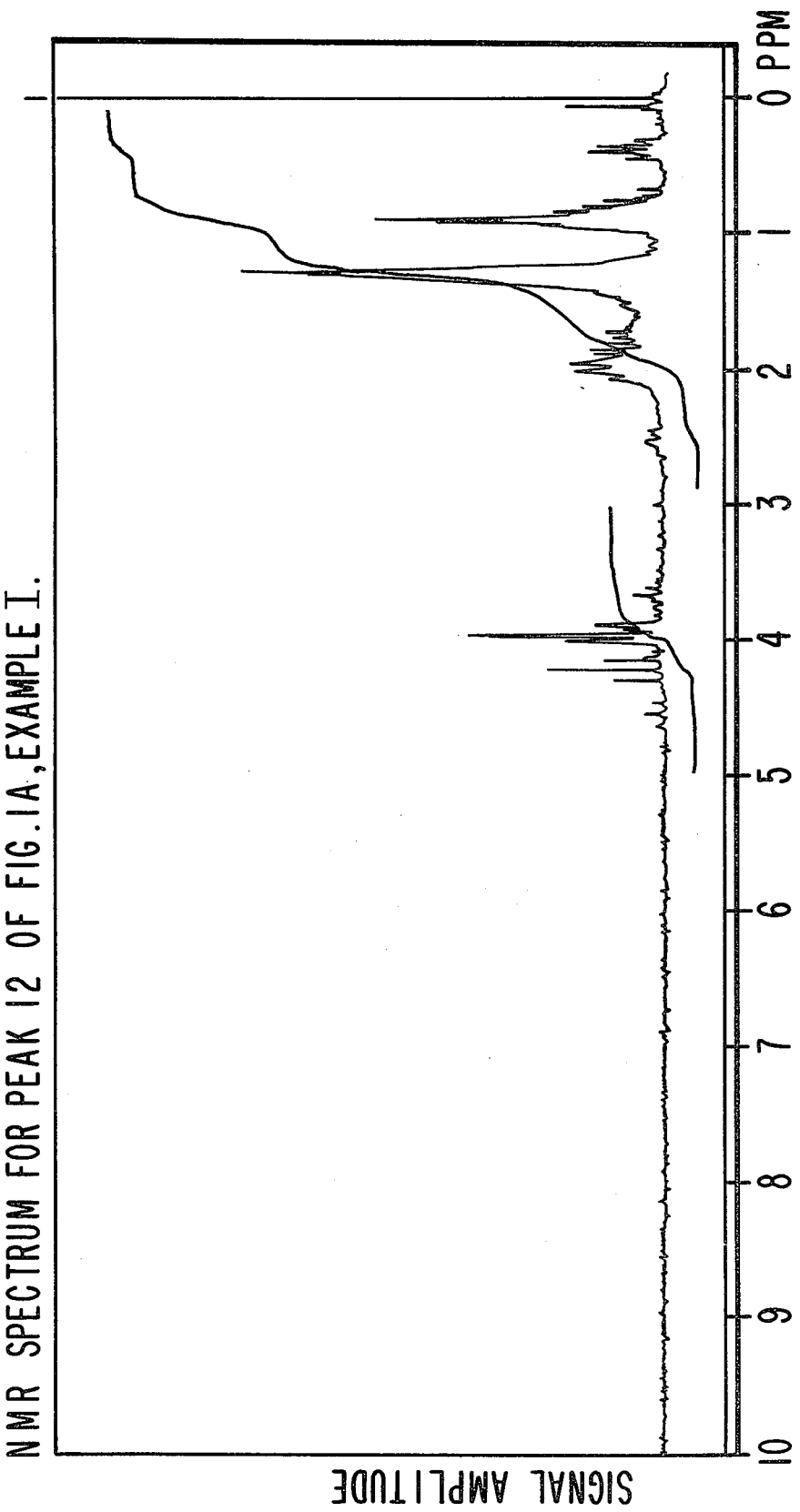

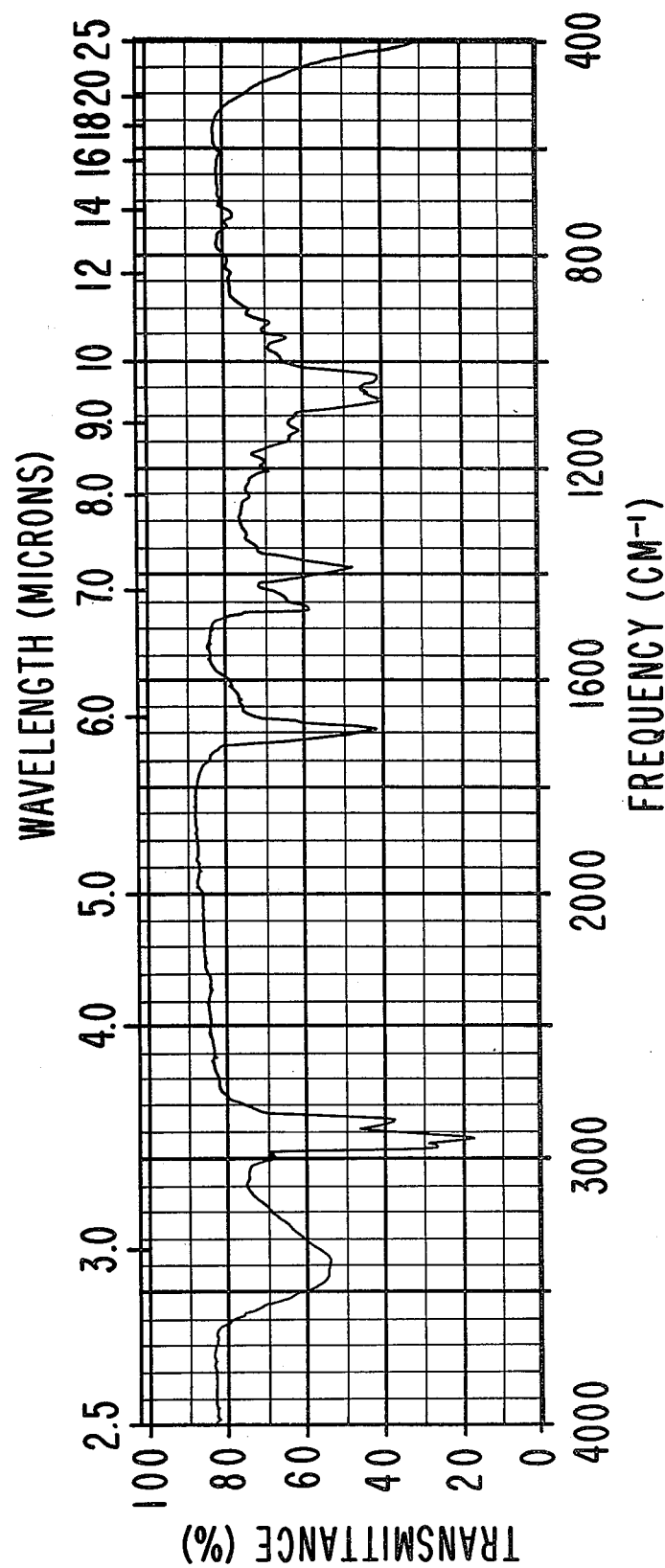

NMR SPECTRUM FOR PEAK 40 OF FIG. 4, EXAMPLE II.

IR SPECTRUM FOR PEAK 40 OF FIG.4, EXAMPLE II.

NMR SPECTRUM FOR PEAK 70 OF FIG. 7, EXAMPLE III.

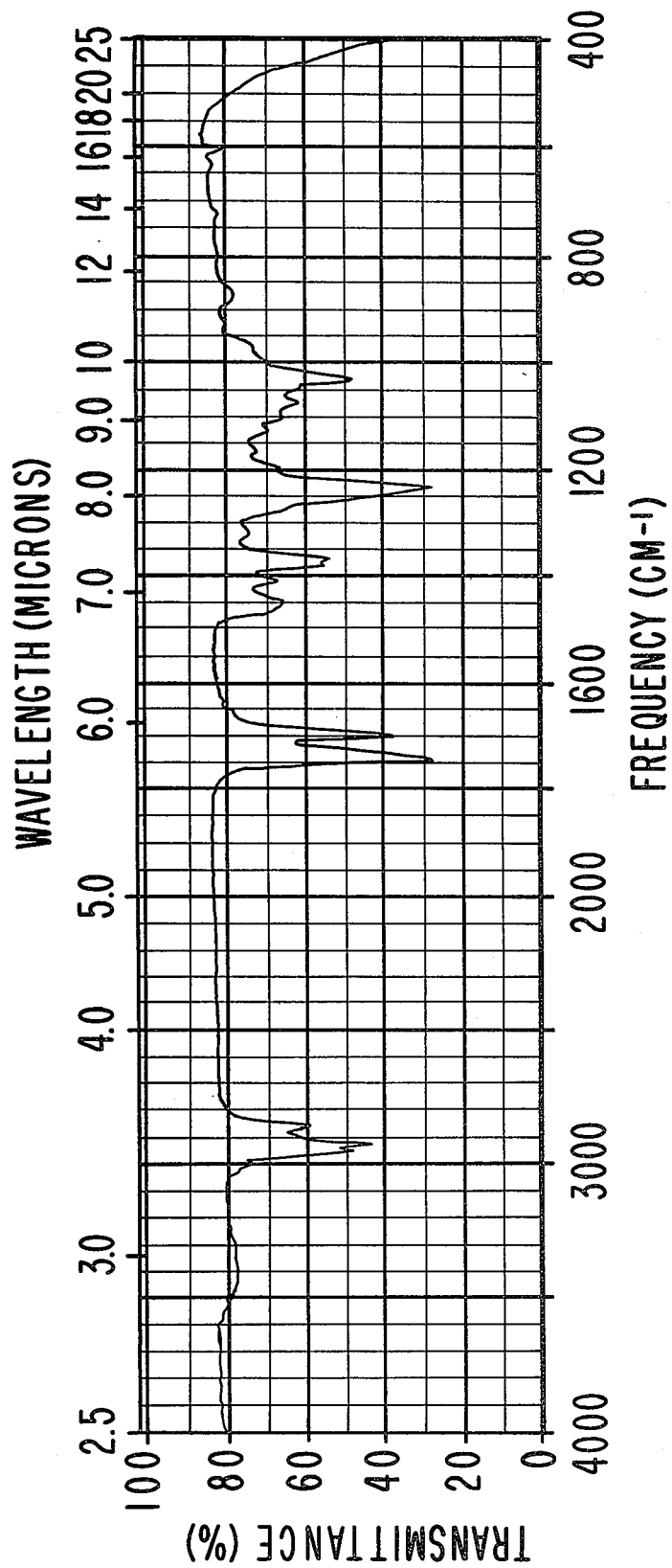

FLAVORING WITH A 1-HYDROXYMETHYL-2-ACYL CYCLOPROPANE DERIVATIVE

This is a divisional of application Ser. No. 422,486, filed 9/23/82 now U.S. Pat. No. 4,435,428.

BACKGROUND OF THE INVENTION

The instant invention is directed to 1-hydroxymethyl-2-acyl cyclopropane derivatives having the generic structure:

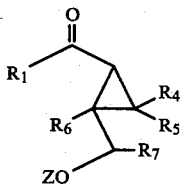

wherein Z represents hydrogen, acyl having the structure:

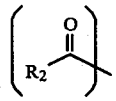

and substituted oxyacyl having the structure:

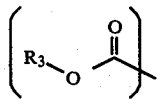

and cyclic condensation products thereof having the structure:

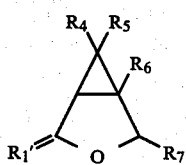

wherein $R_1$, $R_2$ and $R_3$ represent $C_1$–$C_{10}$ alkyl; wherein $R_1'$ is $C_1$–$C_{10}$ alkylidene; and wherein $R_4$, $R_5$, $R_6$ and $R_7$ represent hydrogen or $C_1$–$C_3$ lower alkyl, processes for preparing same involving the reaction of halo methyl oxirane derivatives defined according to the structure:

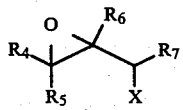

wherein X represents chloro, bromo or iodo with substituted 1,3-propanediones having the structure:

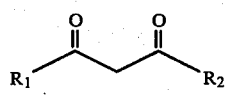

and organoleptic uses thereof in augmenting or enhancing the aroma or taste of consumable materials.

There has been considerable work performed relating to substances which can be used to impart (or alter, modify or enhance) flavors and fragrances to (or in) various consumable materials. These substances are used to diminish the use of natural materials, some of which may be in short supply and to provide more uniform properties in the finished product.

Sweet, green, herbaceous, fruity, pineapple, grapefruit-like, leathery, coconut-like, and jasmine-like aromas with mushroom-like and anisic undertones are particularly desirable in several types of perfume compositions and for use in perfumed articles and colognes.

Sweet, fruity, fresh pineapple-like, fresh grapefruit-like, coconut-like and mushroom-like aroma and taste nuances are particularly desirable for many uses in foodstuff flavors, particularly tropical fruit flavors.

Compounds containing carbonyl functions and cyclopropyl moieties are known for use in the art of perfumery and flavors. Thus, substituted cyclopropane derivatives such as ethyl chrysanthemumate (2,2-dimethyl-3-(2-methylpropenyl)cyclopropane carboxylic acid, ethyl ester) having the structure:

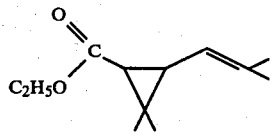

is disclosed as Compound 1187 in "Perfume and Flavor Chemicals (Aroma Chemicals)" Volume 1, Arctander published 1969 as having a powerful, winey, herbaceous, sweet and ethereal, very pleasant odor of intriguing complexity. Arctander states that this material has spicy-herbaceous, warm and almost green-floral notes which resemble certain notes in a jasmine complex. However, no indication exists that this type of compound augments or enhances the nuances stated in the instant application.

Furthermore, U.S. Pat. No. 3,926,860 issued on Dec. 16, 1975 (the disclosure of which is incorporated by reference herein) states that as a result of analyzing natural patchouli oil, it was found that cis-2-n-pentylcyclopropane-1-carboxylic acid having the structure:

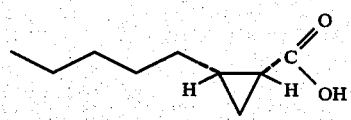

is a key component for patchouli fragrance having a patchouli-like, animal, leathery note and having the capability of imparting such notes to perfumes and cosmetic compositions.

The compound having the structure:

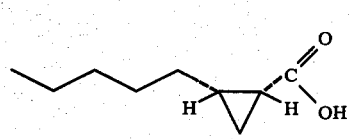

is indicated to have fragrance properties which are surprisingly different in kind from other known compounds and compositions in the "prior art", to wit:

i. Beilstein, Volume E III 9, page 101 disclosing 2-n-hexyl-cyclopropane-carboxylic acid-(1) (no disclosure of aroma);
ii. Snejkal et al., Collection Czech. Chem. Communications 25, 1746–50 (1960) discloses interalia, cis-isobutyl cyclopropane carboxylic acid (no disclosure of aroma);
iii. Danilkina and D'yakonov, Zh. Obshch. Khin., 34 (9) 3129–30 (1964) discloses 2-butyl cyclopropane carboxylic acid (cis/trans mixture with no aroma disclosed);
iv. Dolgii et al., Farmakol. Toksikol. 30(2), 199–203 (1967) discloses 2-n-pentylcyclopropane carboxylic acid (no reference made to isomeric configuration of to aroma);
v. D'yakonov et al., Zh. Obschei. Khim. 35, 2169 (1965) discloses mixtures of cis and trans-2-pentyl-cyclopropane carboxylic acid, the trans acid being in the major proportion. No reference is made to aroma;
vi. Julia et al. Bull Soc. Chim. France 1970, 1805 discloses cis-2-n-butyl cyclopropane carboxylic acid ethyl ester at page 1808 without reference being made to its aroma.

The 1-hydroxymethyl-2-acyl cyclopropane derivatives of the instant invention have chemical structures and properties different in kind from the chemical structures and properties of the compounds of the prior art.

Furthermore, the processes for producing the 1-hydroxymethyl-2-acyl cyclopropane derivatives of our invention are novel. Organic Synthesis, Volume IV, John Wiley & Sons Publishing Company, 1969 at page 597 discloses a technique for making acyl cyclopropane derivatives according to the reaction sequence:

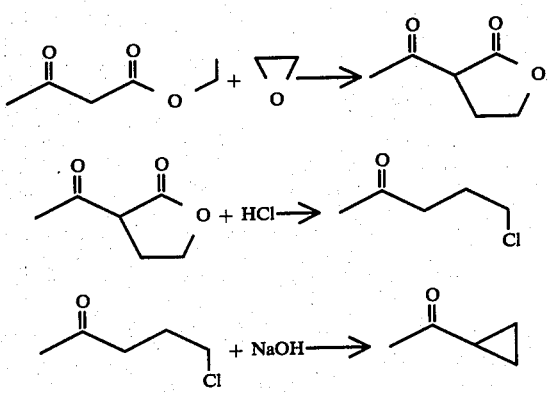

but the mechanism of our invention is neither expressly nor implicitly set forth therein.

Indeed, the prior art teaches away from out invention as is seen by Mesropyan et al. at Chem. Abstracts, Volume 78, 1973, 135590y which teaches the reaction:

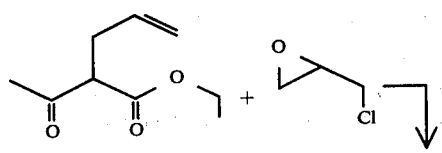

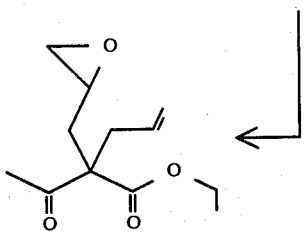

and further, as seen by Arbuzov et al. Volume 80, 1974, Chem. Abstracts 47884h which teaches the reaction:

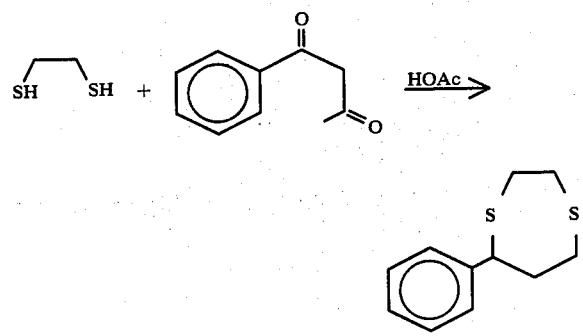

Indeed, no rearrangement of the cyclopropyl moiety occurs when reacting the epichlorohydrin with a difunctional moiety as is shown in the reaction:

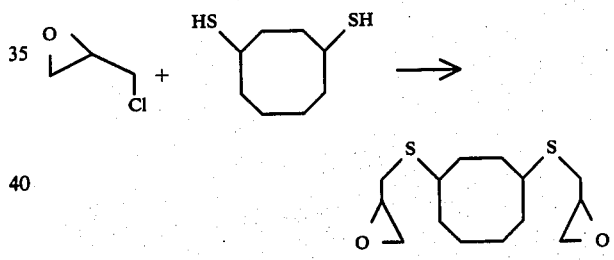

disclosed in Chem. Abstracts 137316n, Volume 78, 1973 (abstract of South African patent 7107,767).

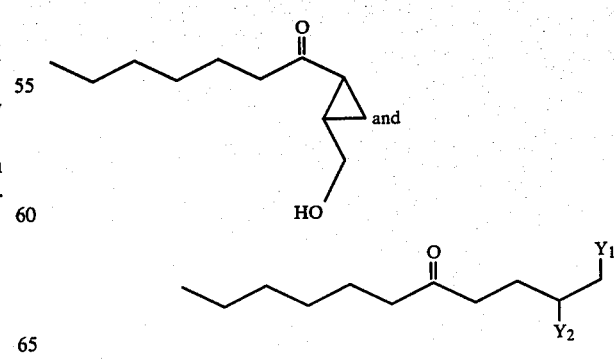

wherein $Y_1$ and $Y_2$ are the same or different and each represents chloro or hydroxyl.

FIG. 1A is the GLC profile for the distillation product of the reaction product of Example I containing the compounds having the structures:

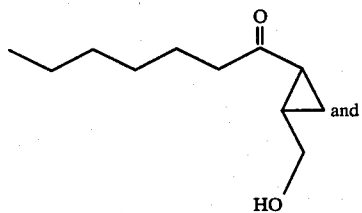

and

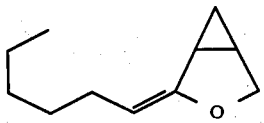

Figure 1:
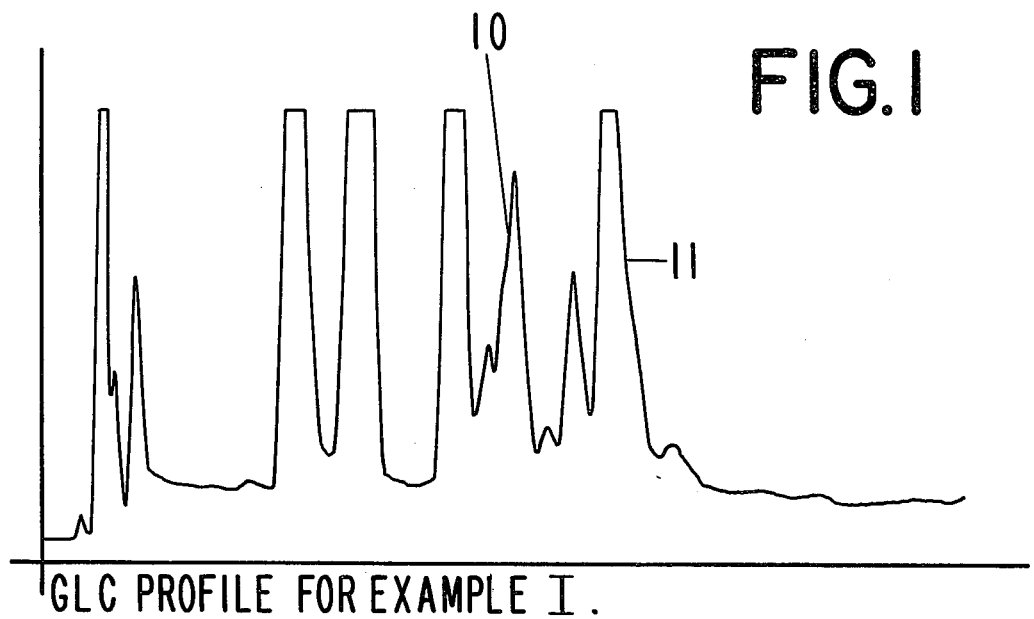
FIG. 1 is the GLC profile for the reaction product of Example I containing the compounds having the structures.

FIG. 2 is the NMR spectrum for the peak indicated by reference numeral "10" in FIG. 1 which is for the compound having the structure:

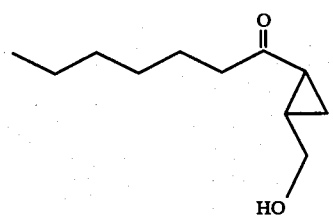

(Solvent: CFCl₃; Field strength: 100 MHz).

FIG. 3 is the infra-red spectrum for the compound of the peak indicated by reference numeral "10" of FIG. 1 having the structure:

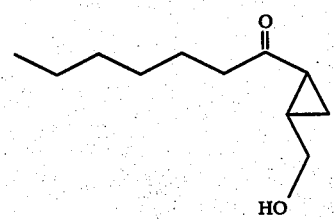

FIG. 3A is the NMR spectrum for the peak indicated by reference numeral "12" on FIG. 1A for the compound having the structure:

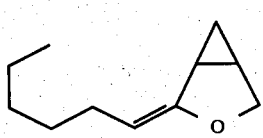

(Solvent: CFCl₃; Field strength: 100 MHz).

FIG. 3B is the IR spectrum for the peak indicated by reference numeral "12" on FIG. 1A which is for the compound having the structure:

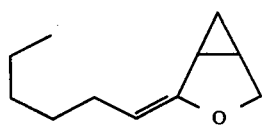

Figure 4:
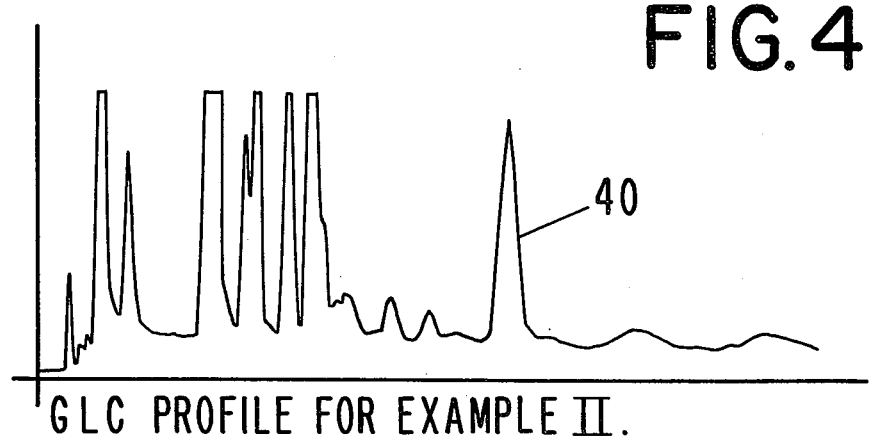

FIG. 4 is the GLC profile for the reaction product of Example II containing the compound having the structure:

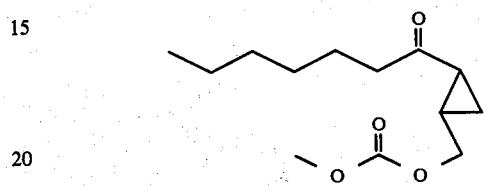

Figure 5:
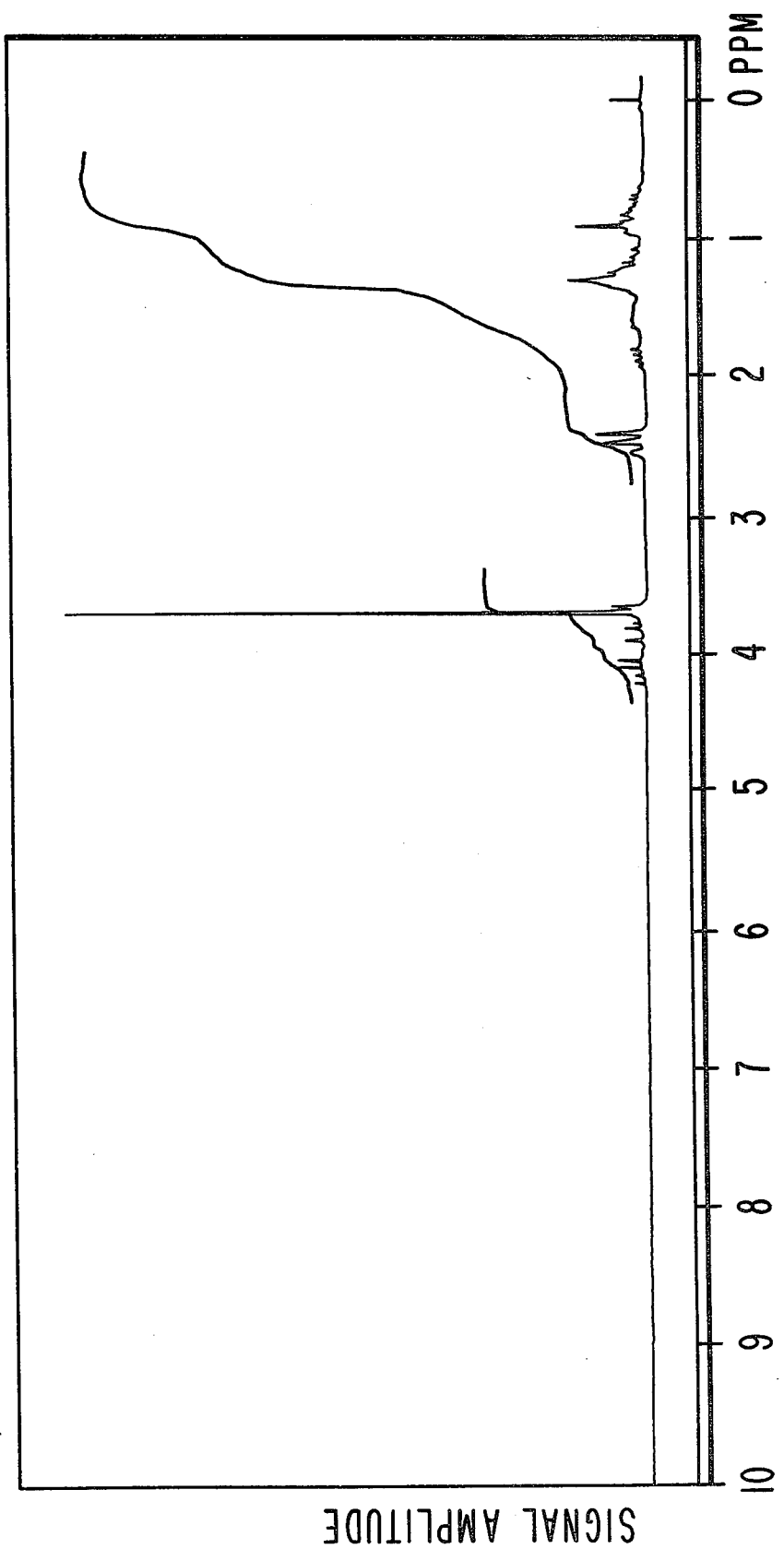

FIG. 5 is the NMR spectrum for the peak indicated by reference numeral "40" on the GLC profile of FIG. 4 for the compound having the structure:

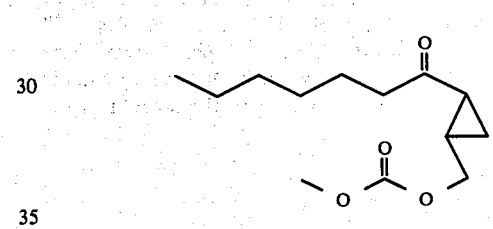

(Solvent: CFCl₃; Field strength: 100 MHz).

Figure 6:
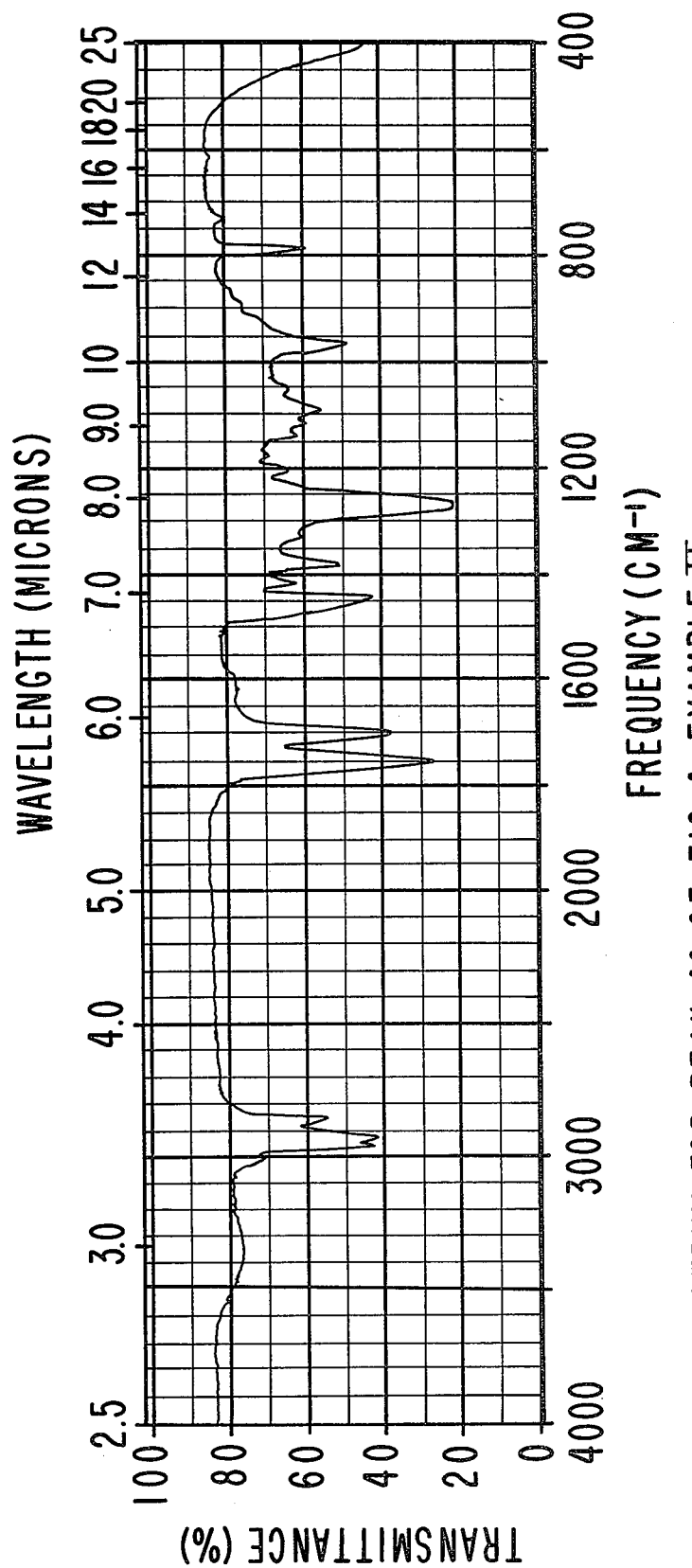

FIG. 6 is the infra-red spectrum for the peak indicated by reference numeral "40" on the GLC profile of FIG. 4 for the compound having the structure:

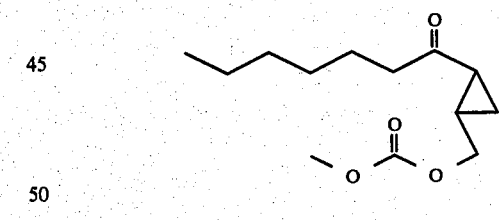

Figure 7:
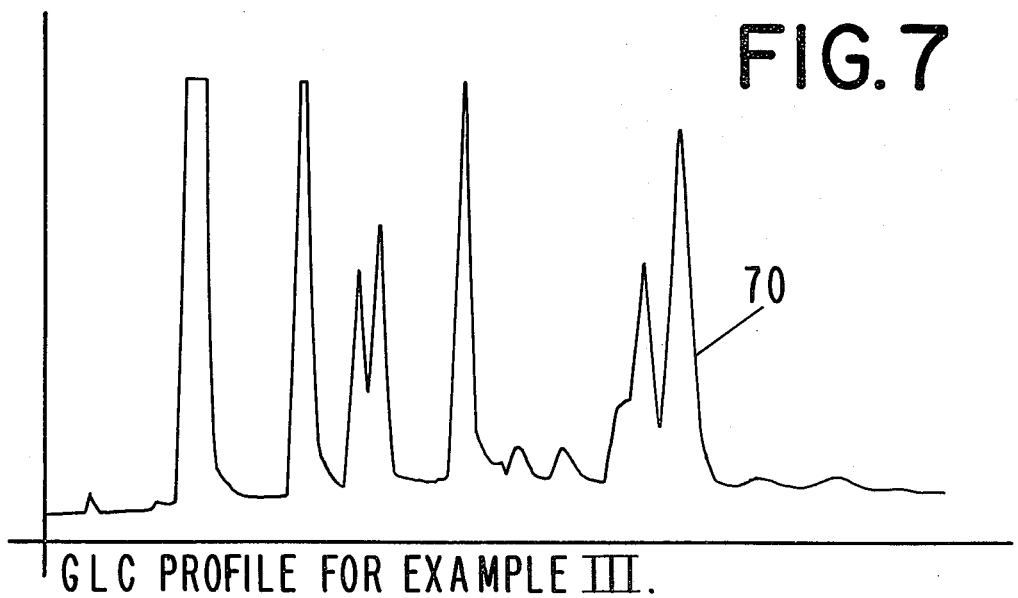

FIG. 7 is the GLC profile for the reaction product of Example III containing the compound having the structure:

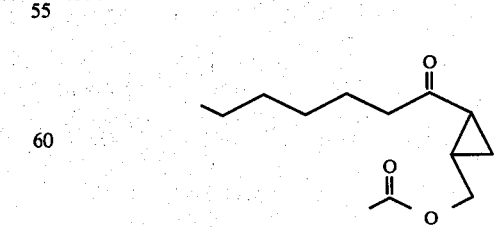

Figure 8:
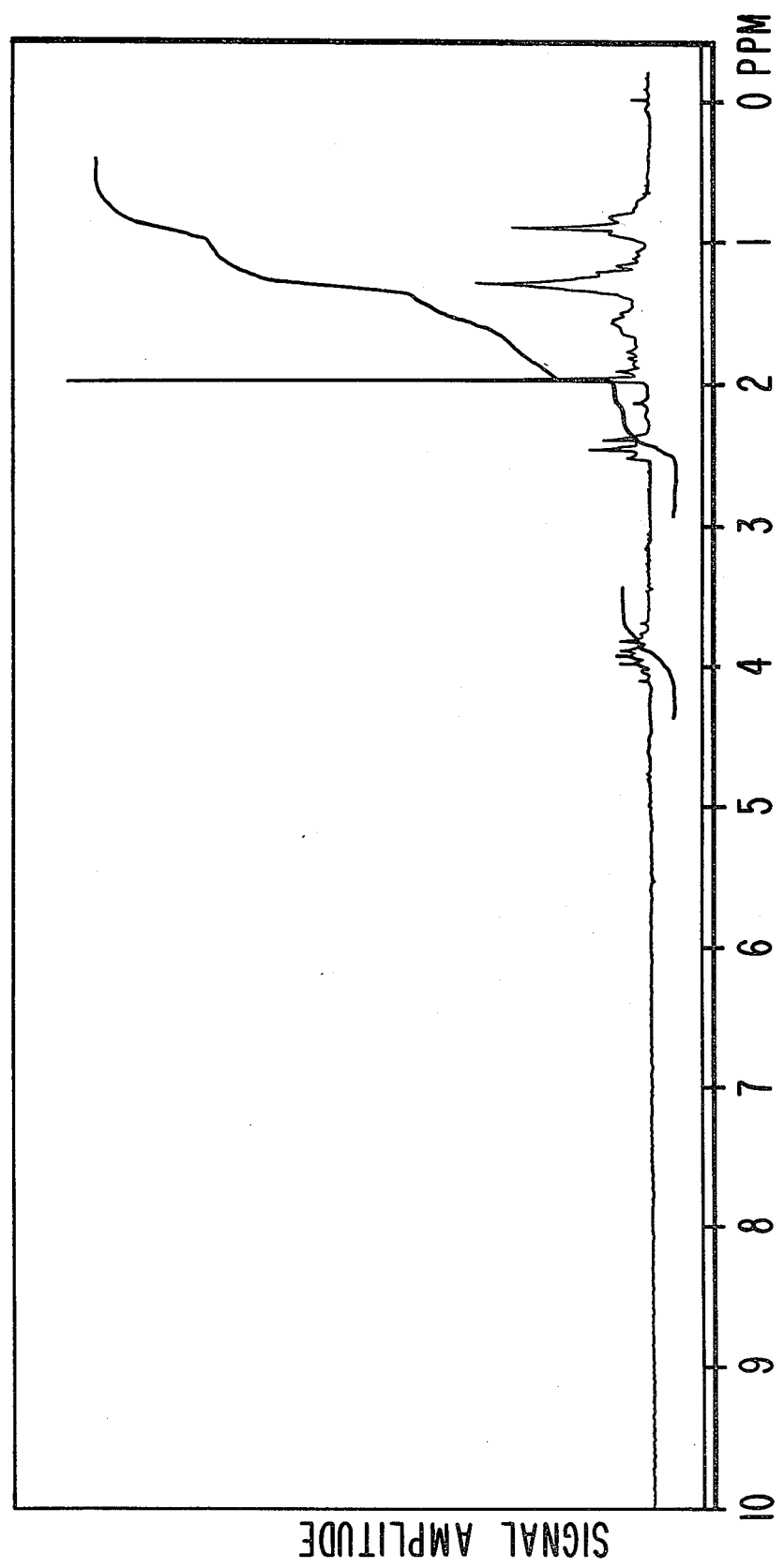

FIG. 8 is the NMR spectrum for the peak indicated by reference numeral "70" on FIG. 7, having the structure:

(Solvent: CFCl₃; Field strength: 100 MHz).

FIG. 9 is the infra-red spectrum for the peak indicated by reference numeral "70" on FIG. 7 for the compound having the structure:

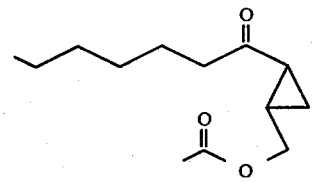

DETAILED DESCRIPTION OF THE DRAWINGS

FIG. 1 is the GLC profile for the reaction product of Example I (conditions: 10% SF-96 column, 6'×0.25" programmed at 100°-220° C. at 8° C. per minute). The peak indicated by reference numeral "10" is the peak for the compounds defined according to the structure:

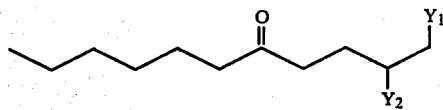

wherein $Y_1$ and $Y_2$ are the same or different and each represents chloro or hydroxyl. The peak indicated by reference numeral "11" is the peak for the compound defined according to the structure:

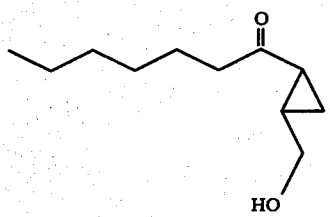

FIG. 1A is the GLC profile for the spinning band distillation product of the reaction product of Example I (conditions: 8'×¼" 10% SF-96 column programmed at 100°-220° C. at 8° C. per minute). The peak indicated by reference numeral "12" is the peak for the compound having the structure:

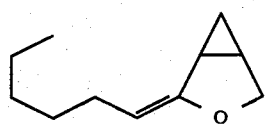

The peak indicated by reference numeral "13" is the peak for the compound having the structure:

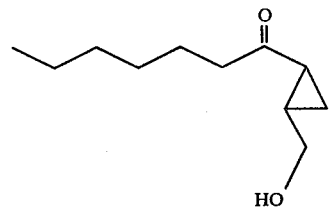

FIG. 4 is the GLC profile for the reaction product of Example II containing the compound having the structure:

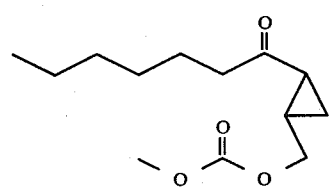

The peak indicated by reference numeral "40" is the peak for the compound having the structure:

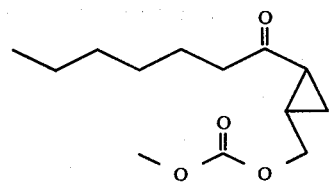

The GLC conditions are: 10% SF-96 column, 6'×0.25", programmed at 100°-220° C. at 8° C. per minute.

FIG. 7 is the GLC profile for the reaction product of Example III. Conditions: 10% SF-96 column, 6'×0.25" programmed at 100°-220° C. at 8° C. per minute. The peak indicated by reference numeral "70" is the peak for the compound having the structure:

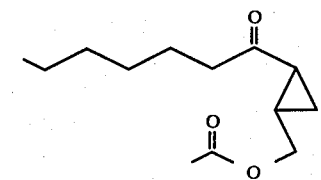

THE INVENTION

It has now been discovered that novel solid and liquid foodstuffs, chewing gums, medicinal products, toothpastes, chewing tobaccos and flavoring compositions therefor having sweet, fruity, pineapple, grapefruit-like, coconut-like and mushroom aroma and taste characteristics, and novel perfume compositions, colognes and perfumed articles having sweet, green, herbaceous, fruity, pineapple, grapefruit-like, leathery, coconut-like, jasmine-like and woody aromas with mushroom-like and anisic-like undertones may be provided by 1-hydroxymethyl-2-acyl cyclopropane derivatives defined according to the structure:

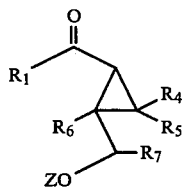

wherein Z represents hydrogen, acyl having the structure:

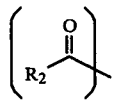

and substituted oxyacyl having the structure:

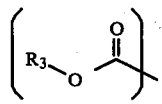

and condensation products thereof defined according to the structure:

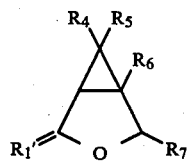

wherein $R_1$, $R_2$ and $R_3$ represent $C_1$-$C_{10}$ alkyl; wherein $R_1'$ represents $C_1$-$C_{10}$ alkylidene; and wherein $R_4$, $R_5$, $R_6$ and $R_7$ represent hydrogen or $C_1$-$C_3$ lower alkyl.

Our invention contemplates various geometric and stereo isomers, for example, the isomers defined according to the generic structure:

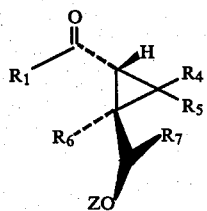

and other "cis" and "trans" isomers. The compounds defined according to the structure:

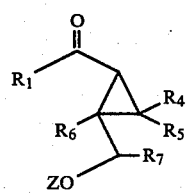

and the compounds defined according to the structure:

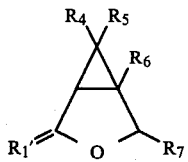

are indicative of mixtures of "cis" or "trans" isomers or individual "cis" or "trans" isomers.

The 1-hydroxymethyl-2-acyl cyclopropane derivatives of our invention may be prepared according to a novel process of our invention by reacting a halomethyloxirane having the structure:

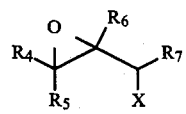

with a disubstituted propanedione having the structure:

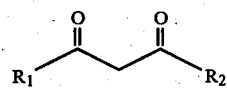

in the presence of an alkali metal alkoxide to form an ester having the structure:

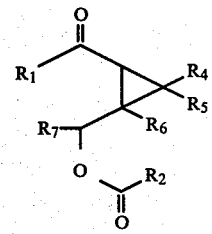

This ester may be isolated and used "as is" for its organoleptic properties or it may be further hydrolyzed to form an alcohol having the structure:

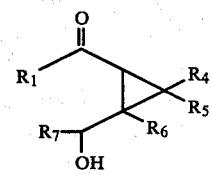

This alcohol may be used "as is" for its organoleptic properties or it may be further reacted with a dialkyl carbonate having the structure:

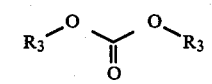

thereby forming the carbonate having the structure:

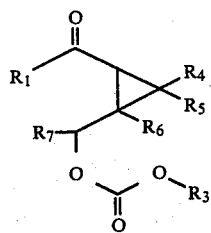

which is isolated and used for its organoleptic properties; or this alcohol may be condensed according to the reaction:

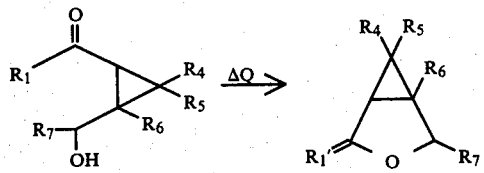

by heating the alcohol and removing a molecule of water to form the compound having the structure:

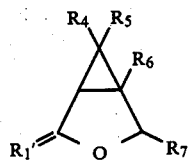

The reaction between the disubstituted propanedione and the halo methyl oxirane derivative is shown according to the following scheme:

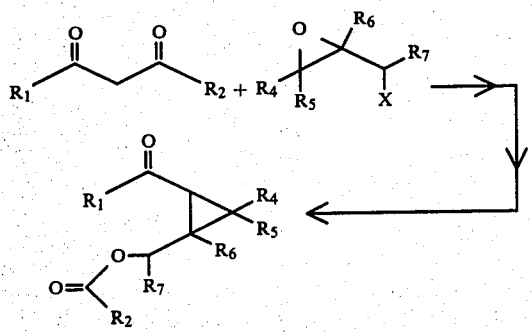

The reaction of the resulting ester with a hydrolysis agent is shown according to the following scheme:

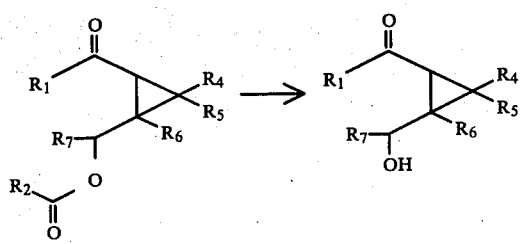

In preparing the compound having the structure:

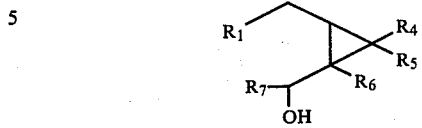

and in purifying same, at higher temperatures of distillation, these compounds will self-condense thereby forming compounds defined according to the structure:

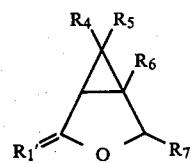

wherein $R_1'$ is $C_1$–$C_{10}$ alkylidene. If the distillation is carried out at a very high temperature, high yields of compounds defined according to the structure:

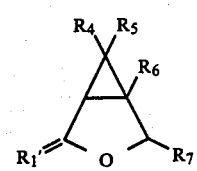

will be formed. These compounds are also useful for their aroma properties.

The reaction of the resulting alcohol with the dialkyl carbonate to form the carbonate derivative is shown according to the reaction:

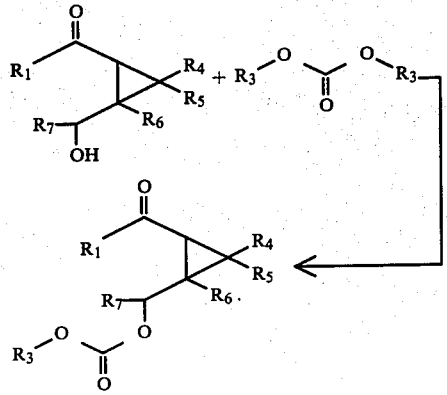

The reaction mechanism to form the acetate using the alkali metal alkoxide is shown thusly:

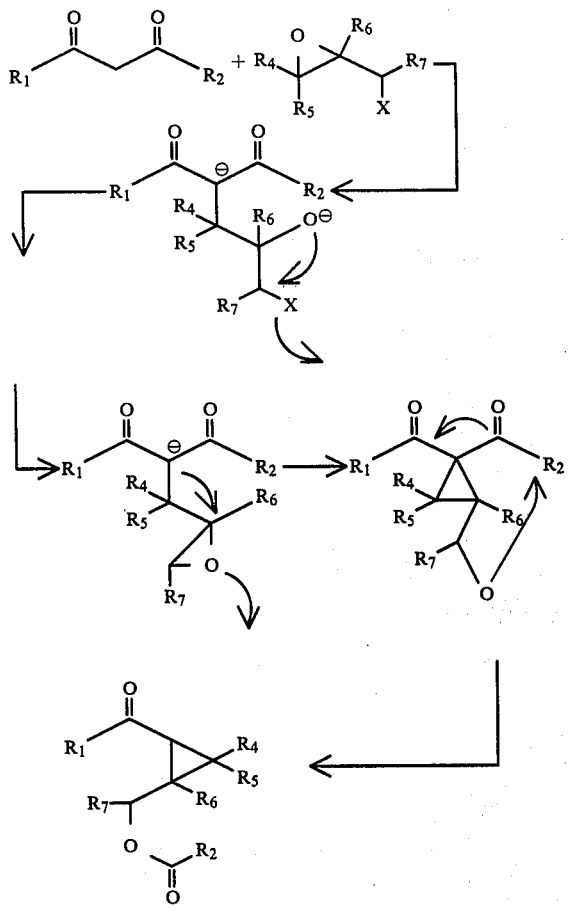

In examining the foregoing mechanism, the first compound that is formed can be depicted according to the structure:

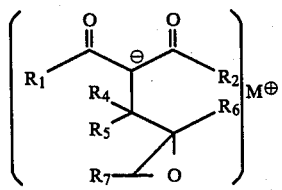

wherein the alkali metal alkoxide, M, O, R" is involved in the formation of the intermediate wherein M represents alkali metal including lithium, potassium and sodium and R" is alkyl including ethyl, methyl, n-propyl, isopropyl, n-butyl, secondary butyl and t-butyl. The compound having the structure:

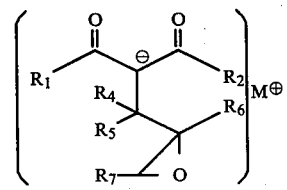

rearranges to form the compound having the structure:

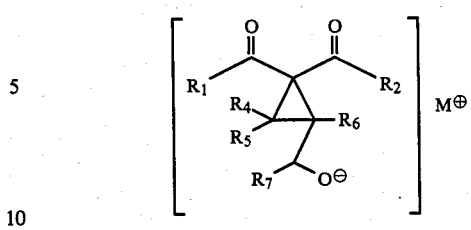

which, in turn, rearranges to form the ester having the structure:

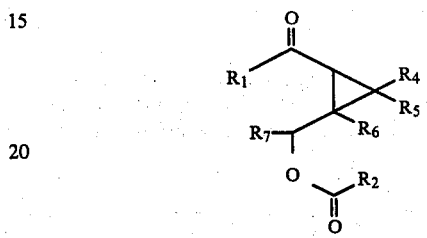

In place of the halomethyloxirane, equivalent compounds may be used, for example, those defined according to the structure:

or according to the structure:

wherein X is halogen including chloro, bromo and iodo and $X_1$ and $X_2$ are the same or different and each represents chloro, bromo or iodo.

In carrying out the reaction between the substituted 1,3-propanedione and the halo methyl oxirane or substitute therefor, the mole ratio of epihalo oxirane:substituted propanedione may vary from 0.5:1 up to 1:0.5 with a preferred mole ratio of halo methyl oxirane:substituted propanedione being about 1:1. The mole ratio of alkali metal alkoxide:substituted 1,3-propanedione may vary from about 3:1 down to about 1:1 with a preferred mole ratio of alkali metal alkoxide:substituted 1,3-propanedione being about 2:1. The reaction takes place in a non-reactive solvent and preferred solvents are methyl alcohol, ethyl alcohol, n-propanol and isopropanol. The reaction temperature may vary from about 70° C. up to about 120° C. and is preferably carried out at reflux conditions. The reaction pressure may vary from 0.5 atmospheres up to about 20 atmospheres but is most conveniently 1 atmosphere. Accordingly, the reaction is preferred to be carried out at a temperature in the range of from about 65° C. up to about 95° C. at atmospheric pressure. The time of reaction may vary from about 1 hour up to about 12 hours depending upon the temperature and pressure of reaction with higher temperatures of reaction giving rise to a lesser amount of required time of reaction to obtain the desired yield. At the end of the reaction, the reaction product may be isolated and fractionally distilled (in the event that it is desired to be used for its organoleptic properties). This product is the ester defined according to the structure:

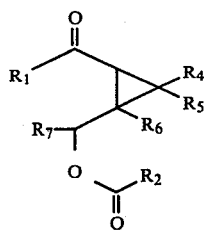

On the other hand, the resulting reaction product may be hydrolyzed without isolation, in situ in order to form the alcohol defined according to the structure:

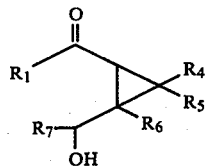

The hydrolysis is carried out at a temperature of from about 0° C. up to about 100° C. with a preferred hydrolysis temperature of between 60° and 85° C. using aqueous dilute mineral acid such as dilute hydrochloric acid, dilute sulfuric acid or dilute phosphoric acid. Preferably the mineral acid is between 2% and 20% hydrochloric acid. In addition, aqueous solutions of salts which have a pH of between 0.5 and 3 may be used, e.g. aqueous ammonium chloride.

The resulting hydrolysis product having the structure:

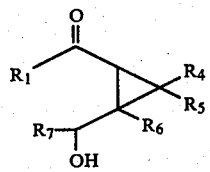

may be isolated from the reaction mass and fractionally distilled or it may be further reacted after isolation from the reaction mass, with a dialkyl carbonate defined according to the structure:

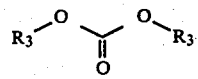

Thus, the carbonates of our invention defined according to the structure:

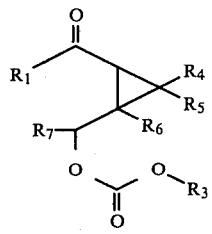

are prepared by reaction of the compounds defined according to the structure:

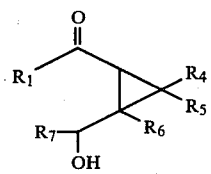

with the dialkyl carbonates having the structure:

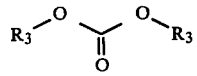

in the presence of an alkali metal alkoxide such as sodium methoxide, sodium ethoxide, sodium t-butoxide, potassium methoxide, potassium ethoxide and potassium t-butoxide. The reaction between the alcohol and the dialkyl carbonate takes place in the absence of any additional solvent. The mole ratio range of dialkyl carbonate:alcohol may vary from about 3 moles dialkyl carbonate:0.5 moles alcohol down to 1 mole dialkyl carbonate:1 mole alcohol. It is preferred that the mole ratio of dialkyl carbonate:alcohol be about 2:1. The ratio of alkali metal alkoxide:dialkyl carbonate may vary from about 0.1:1 up to about 1:1 with a preferred ratio of alkali metal alkoxide:dialkyl carbonate of 1:2 (mole ratio) being preferred.

The reaction temperature range may vary from about 50° C. up to about 100° C. and the reaction pressure may vary from about atmospheric pressure up to about 10 atmospheres. Higher temperatures of reaction necessitate higher pressures over the reaction mass in order to prevent the reaction product from evaporating therefrom.

During the reaction, the alkyl ester reaction product is continuously removed as by using a Bidwell trap apparatus.

Examples of the reaction products prepared in accordance with the process of our invention and their organoleptic properties are as follows:

TABLE I

| Reaction Product Structure | Perfume Properties | Food Flavor Properties |
|---|---|---|
| | A woody, jasmine, floral, green, fruity, leathery, herbaceous, pineapple-like aroma profile. | A sweet, fruity, fresh pineapple aroma and taste at 0.2 ppm. |

TABLE I-continued

| Reaction Product Structure | Perfume Properties | Food Flavor Properties |
|---|---|---|
| 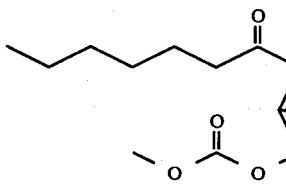 | A floral, jasmine, fruity, sweet, grapefruit-like, leathery and coconut-like aroma profile. | A sweet, grapefruit-like, coconut-like aroma and taste profile at 0.1 ppm. |
| 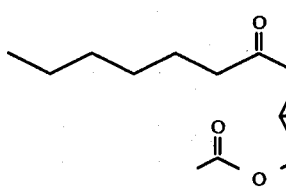 | A floral (jasmine-like), green, fruity, mushroom-like aroma profile with intense mushroom-like and anisic-like undertones. | A green, mushroom licorice-like, fruity aroma and taste profile at 0.05 ppm. |
| 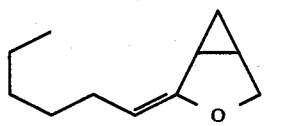 | A floral, jasmine-like aroma. | A tropical fruit taste at 0.1 ppm. |

An additional aspect of our invention is in the admixture of compounds having the structure:

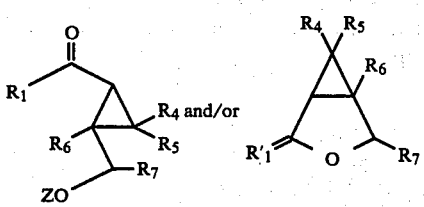

in combination with normethyl jasmonate having the structure:

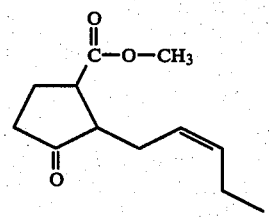

and methyl jasmonate having the structure:

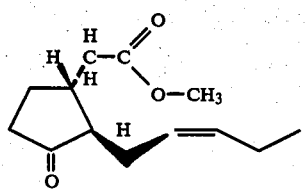

The operable mole ratio of 1-hydroxymethyl-2-acyl cyclopropane derivatives of our invention to methyl jasmonate or normethyl jasmonate (mole ratios) is from 0.1:1 up to 1:0.1.

The 1-hydroxymethyl-2-acyl cyclopropane derivatives of our invention can be used to contribute an intense, woody, jasmine, floral, green, fruity, sweet, herbaceous, pineapple-like, grapefruit-like, leathery, coconut-like, mushroom-like aroma with mushroom-like and anisic-like undertones to perfumes, perfumed articles and colognes. (Samples of perfumed articles are anionic, cationic, nonionic or zwitterionic solid or liquid detergents, fabric softeners including drier-added fabric softener articles and fabric softener compositions, perfumed polymers and shampoos.) As olfactory agents, the 1-hydroxymethyl-2-acyl cyclopropane derivatives of our invention can be formulated into or used as components of a "perfume composition" or can be used as components of a "perfumed article" or the perfume composition may be added to "perfumed articles".

The term "perfume composition" is used herein to mean a mixture of organic compounds including, for example, alcohols (other than the alcohols of our invention), aldehydes, ketones, nitriles, ethers, lactones, esters (other than the esters of our invention), carbonates (other than the carbonates of our invention), natural essential oils, synthetic essential oils and frequently hydrocarbons which are admixed so that the combined odors of the individual components produce a pleasant or a desired fragrance. Such perfume compositions usually contain (a) the main note or "bouquet" or foundation stone of the composition; (b) modifiers which round off and accompany the main note; (c) fixatives which include odorous substances which lend a particular note to the perfume throughout all stages of evaporation, and substances which retard evaporation; and (d) topnotes which are usually low-boiling, fresh-smelling materials.

In perfume compositions, the individual component will contribute its particular olfactory characteristics, but the overall effect of the perfume composition will be the sum of the effects of each of the ingredients. Thus, the individual compounds of this invention or mixtures thereof can be used taken alone or in combination with normethyl jasmonate and methyl jasmonate to alter the aroma characteristics of a perfume composition, for example, by highlighting or moderating the olfactory reaction contributed by another ingredient in the composition. The amount of the 1-hydroxymethyl- 2-acyl cyclopropane derivatives of this invention which will be effective in perfume compositions depends on many factors, including the other ingredients, their amounts and the effects which are desired. It has been found that perfume compositions containing as little as 0.5% of the 1-hydroxymethyl-2-acyl cyclopropane derivatives of our invention or even less, can be used to impart or augment interesting sweet, green, herbaceous, fruity, jasmine, floral, leathery, grapefruit-like, coconut-like and mushroom-like aromas with mushroom-like and anisic undertones to soaps, liquid and solid cationic, anionic, nonionic or zwitterionic detergents, cosmetic powders, liquid and solid fabric softeners, drier-added fabric softener articles, optical brightener compositions, perfumed polymers and other products. The amount employed can range up to 50% or more and will depend on considerations of cost, nature of the end product and the effect desired on the finished product and particular fragrance sought.

The 1-hydroxymethyl-2-acyl cyclopropane derivatives of our invention can be used alone or in a perfume composition as an olfactory component in detergents and soaps, space odorants and deodorants; perfumes; colognes, toilet water, bath salts; hair preparations such as lacquers, pomades, brilliantines and shampoos; cosmetic preparations such as creams, deodorants, hand lotions and sun screens; powders such as talcs, dusting powders, face powders and the like. When used as an olfactory component of a perfumed article such as a cationic, nonionic, anionic or zwitterionic solid or liquid detergent, as little as 0.01% of the 1-hydroxymethyl-2-acyl cyclopropane derivatives will suffice to impart an interesting woody, jasmine, floral, green, leathery, fruity, herbaceous, pineapple-like, grapefruit-like, coconut-like and mushroom-like aroma with mushroom-like and anisic undertones. Generally no more than 0.9% by weight of the perfumed article is required. Accordingly, the range of 1-hydroxymethyl-2-acyl cyclopropane derivatives in the perfumed article may vary from about 0.01% up to about 0.9%.

In addition, the perfume composition can contain a vehicle or carrier for the 1-hydroxymethyl-2-acyl cyclopropane derivatives alone or with other ingredients such as methyl jasmonate or normethyl jasmonate. The vehicle can be a liquid such as a non-toxic alcohol such as ethanol, a glycol such as propylene glycol or the like. The carrier can be an absorbent solid such as a gum such as gum arabic, guar gum or xanthan gum or components for encapsulating the composition such as gelatin which can be used to form a capsule wall surrounding the perfume oil as by means of coacervation, or a urea formaldehyde prepolymer which can be used to form a polymeric urea formaldehyde wall surrounding the perfume oil by means of polymerization.

In addition to its uses in perfumery, perfumed articles or colognes in augmenting or enhancing the aroma of perfumes, perfumed articles and colognes, the 1-hydroxymethyl-2-acyl cyclopropane derivatives of our invention can be used to augment or enhance the aroma or taste of other consumable materials including foodstuffs, chewing gums, toothpastes, medicinal products and chewing tobaccos.

When the 1-hydroxymethyl-2-acyl cyclopropane derivatives of our invention are used as food flavor adjuvants or medicinal product flavor adjuvants or toothpaste flavor adjuvants or chewing gum flavor adjuvants or chewing tobacco flavor adjuvants, the nature of the co-ingredients included with each of said 1-hydroxymethyl-2-acyl cyclopropane derivatives in formulating the product composition will also serve to augment or enhance the organoleptic characteristics of the ultimate foodstuff, chewing gum, medicinal product, toothpaste or chewing tobacco treated therewith.

Substances suitable for use herein as co-ingredients or flavoring adjuvants are well known in the art for such use, being extensively described in the relevant literature. It is required that any such material be "ingestibly acceptable", and thus non-toxic or otherwise non-deleterious, particularly from an organoleptic standpoint whereby the ultimate flavor and/or aroma of the consumable material used does not cause the consumable material to have unacceptable aroma and taste nuances.

It is a further requirement that such material be organoleptically compatible with the foodstuff with which it is used so that the flavor and aroma nuances of such material, taken together with the flavor and aroma nuances of the foodstuff (as a whole) give rise to a harmoniously aesthetically pleasing aroma and taste profile. Such materials, in general, may be characterized as flavoring adjuvants or vehicles comprising broadly, stabilizers, thickeners, surface active agents, conditioners, other flavorants and flavor intensifiers.

Stabilizer compounds include preservatives, e.g. sodium chloride, antioxidants, e.g. calcium and sodium ascorbate, ascorbic acid, butylated hydroxy-anisole (mixture of 2- and 3-tertiary-butyl-4-hydroxy-anisole), butylated hydroxy toluene (2,6-ditertiary-butyl-4-methyl phenol), propyl gallate and the like and seqestrants, e.g. citric acid.

Thickener compounds include carriers, binders, protective colloids, suspending agents, emulsifiers and the like, e.g. agar agar, carrageenan, cellulose and cellulose derivatives such as carboxymethyl cellulose and methyl cellulose; natural and synthetic gums such as gum arabic, gum tragacanth, gelatin, proteinaceous materials, lipids, carbohydrates, starches, pectins and emulsifiers, e.g. mono- and diglycerides of fatty acids, skim milk powder, hexoses, pentoses, disaccharides, e.g. sucrose, corn syrup and the like.

Surface active agents include emulsifying agents, e.g. fatty acids such as palmitic acid, myristic acid and the like, mono- and diglycerides of fatty acids, lecithin, defoaming and flavor-dispensing agents such as sorbitan monostearate, potassium monostearate, hydrogenated tallow alcohol and the like.

Conditioners include compounds such as bleaching and maturing agents, e.g. benzoyl peroxide, calcium peroxide, hydrogen peroxide and the like, starch modifiers such as peracetic acid, sodium chlorite, sodium hypochlorite, propylene oxide, succinic anhydride and the like, buffers and neutralizing agents, e.g. sodium acetate, ammonium bicarbonate, ammonium phosphate, citric acid, lactic acid, vinegar and the like, colorants, e.g. carminic acid, cochineal, tumeric, curcumin and the like; firming agents such as aluminum sodium sulfate, calcium chloride and calcium gluconate; texturizers, anti-caking agents, e.g. aluminum calcium sulfate and tribasic calcium phosphate; enzymes; yeast foods, e.g. calcium lactate and calcium sulfate; nutrient supplements, e.g. iron salts such as ferric phosphate, ferrous gluconate and the like, riboflavin, vitamins, zinc sources such as zinc chloride, zinc sulfate and the like.

Other flavorants and flavor intensifiers include organic acids, e.g. acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid, 2-methyl-cis-3-pentenoic acid; ketones and aldehydes, e.g. octanal, n-decanal, acetaldehyde, acetophenone, acetone, acetyl methyl carbinol, acrolein, n-butanal, crotonal, diacetyl, 2-methyl butanal, beta,betadimethyl-acrolein, methyl-n-amyl ketone, n-hexanal, 2-hexenal, isopentanal, hydrocinnamic aldehyde, cis-3-hexenal, 2-heptenal, nonyl aldehyde, citral, 4-(p-hydroxyphenyl)-2-butanone, alpha-ionone, beta-ionone, 2-methyl-3-butanone, benzaldehyde, damascone, damascenone, acetophenone, 2-heptanone, o-hydroxyacetophenone, 2-methyl-2-hepten-6-one, 2-octanone, 2-undecanone, 3-phenyl-4-pentenal, 2-phenyl-2-hexenal, 2-phenyl-2-pentenal, furfural, 2-methyl furfural, cinnamaldehyde, beta-cyclohomocitral, 2-pentanone, 2-pentenal and propanal; alcohols such as 1-butanol, benzyl alcohol, 1-borneol, trans-2-buten-1-ol, ethanol, geraniol, 1-hexanol, 2-heptanol, trans-2-hexenol-1, cis-3-hexen-1-ol, 3-methyl-3-buten-1-ol, 1-pentanol, 1-penten-3-ol, p-hydroxyphenyl-2-ethanol, isoamyl alcohol, fenchyl alcohol, isofenchyl alcohol, phenyl-2-ethanol, alpha-terpineol, cis-terpineol hydrate, eugenol, linalook, 2-heptanol, acetoin; esters such as butyl acetate, ethyl acetate, ethyl acetoacetate, ethyl benzoate, ethyl butyrate, ethyl caprate, ethyl caproate, ethyl caprylate, ethyl cinnamate, ethyl crotonate, ethyl formate, ethyl isobutyrate, ethyl isovalerate, ethyl laurate, ethyl myristate, ethyl alpha-methylbutyrate, ethyl propionate, ethyl salicylate, trans-2-hexenyl acetate, hexyl acetate, 2-hexyl butyrate, hexyl butyrate, isoamyl acetate, isopropyl butyrate, dimethylanthranilate, methyl acetate, methyl butyrate, methyl caproate, methyl isobutyrate, alpha-methylphenylglycidate, ethyl succinate, isobutyl cinnamate, cinnamyl formate, methyl cinnamate and terpinenyl acetate; hydrocarbons such as dimethyl naphthalene, dodecane, methyl diphenyl, methyl naphthalene, myrcene, cadinene, limonene, naphthalene, octadecane, tetradecane, tetramethyl naphthalene, tridecane, trimethyl naphthalene, undecane, caryophyllene, 1-phellandrene, p-cymene, 1-alpha-pinene; pyrazines such as 2,3-dimethylpyrazine, 2,5-dimethylpyrazine, 2,6-dimethylpyrazine, 3-ethyl-2,5-dimethylpyrazine, 2-ethyl-3,5,6-trimethylpyrazine, 3-isoamyl-2,5-dimethylpyrazine, 5-isoamyl-2,3-dimethyl-yl-pyrazine, 2-isoamyl-3,5,6-trimethylpyrazine, isopropyl dimethylpyrazine, alpha-methyl-3-ethylpyrazine, tetramethylpyrazine, trimethylpyrazine; essential oils such as jasmine absolute, cassia oil, cinnamon bark oil, rose absolute, orris absolute, lemon essential oil, orange essential oil, grapefruit essential oil, Bulgarian rose, yara yara and vanilla; lactones such as gammanonalactone; sulfides, e.g. methyl sulfide and other materials such as maltol and acetals (e.g. 1,1-diethoxyethane, 1,1-dimethoxyethane and dimethoxymethane).

The specific flavoring adjuvants selected for use may be either solid or liquid depending upon the desired physical form of the ultimate product, i.e. foodstuff, whether simulated or natural, and should, in any event, (1) be organoleptically compatible with the 1-hydroxymethyl-2-acyl cyclopropane derivatives of our invention by not covering or spoiling the organoleptic properties (aroma and/or taste) thereof; (2) be nonreactive with the 1-hydroxymethyl-2-acyl cyclopropane derivatives of our invention; and (3) be capable of providing an environment in which the 1-hydroxymethyl-2-acyl cyclopropane derivatives can be dispersed or admixed to provide a homogeneous medium. In addition, selection of one or more flavoring adjuvants, as well as the quantities thereof will depend upon the precise organoleptic character desired in the finished product. Thus, in the case of flavoring compositions, ingredient selection will vary in accordance with the foodstuff, chewing gum, medicinal product or toothpaste to which the flavor and/or aroma are to be imparted, modified, augmented or enhanced. In contradistinction, in the preparation of solid products, e.g. simulated foodstuffs, ingredients capable of providing normally solid compositions should be selected such as various cellulose derivatives.

As will be appreciated by those skilled in the art, the amount of 1-hydroxymethyl-2-acyl cyclopropane derivatives employed in a particular instance can vary over a relatively wide range, depending upon the desired organoleptic effects to be achieved. Thus, correspondingly greater amounts would be necessary in those instances wherein the ultimate food composition to be flavored is relatively bland to the taste, whereas relatively minor quantities may suffice for purposes of enhancing the composition merely deficient in natural flavor or aroma. The primary requirement is that the amount selected be effective, i.e. sufficient to augment or enhance the organoleptic characteristics of the parent composition, whether foodstuff per se, chewing gum per se, medicinal product per se, toothpaste per se, or flavoring composition.

The use of insufficient quantities of 1-hydroxymethyl-2-acyl cyclopropane derivatives will, of course, substantially vitiate any possibility of obtaining the desired results while excess quantities prove needlessly costly and, in extreme cases, may disrupt the flavor-aroma balance, thus proving selfdefeating. Accordingly, the terminology "effective amount" and "sufficient amount" is to be accorded a significance in the context of the present invention consistent with the obtention of desired flavoring effects.

Thus, and with respect to ultimate food compositions, chewing gum compositions, medicinal product compositions and toothpaste compositions, it is found that quantities of 1-hydroxymethyl-2-acyl cyclopropane derivatives ranging from a small but effective amount, e.g. 0.02 parts per million (ppm) up to about 50 parts per million (ppm) based on total composition are suitable. Concentrations in excess of the maximum quantity stated are not normally recommended, since they fail to provide commensurate enhancement of organoleptic properties. In those instances where the 1-hydroxymethyl-2-acyl cyclopropane derivatives are added to the foodstuff as an integral component of a flavoring composition, it is, of course, essential that the total quantity of flavoring composition employed be sufficient to yield an effective 1-hydroxymethyl-2-acyl cyclopropane derivative concentration in the foodstuff product.

Food flavoring compositions prepared in accordance with the present invention preferably contain the 1-hydroxymethyl-2-acyl cyclopropane derivatives in concentrations ranging from about 0.05% up to about 5% by weight based on the total weight of the said flavoring composition.

The composition described herein can be prepared according to conventional techniques well know as typified by cake batters and fruit drinks and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by mixing the 1-hydroxymethyl-2-acyl cyclopropane derivatives of our invention with, for example, gum arabic, gum tragacanth, carrageenan and the like, and thereafter spraydrying the resultant mixture whereby to obtain the particulate solid product. Pre-prepared flavor mixes in powder form, e.g. a fruit-flavored powder mix is obtained by mixing the dried solid components, e.g. starch, sugar and the like and the 1-hydroxymethyl-2-acyl cyclopropane derivatives in a dry blender until the requisite degree of uniformity is achieved.

It is presently preferred to combine with the 1-hydroxymethyl-2-acyl cyclopropane derivatives of our invention the following adjuvants:

bergamot oil;
citral;
amyl alcohol;
ethyl acetate;
5-phenyl-4-pentenal;
5-phenyl-2-pentenal;
n-octanal;
n-decanal;
limonene;
geraniol;
cadinene;
dimethylanthranilate;
vanillin;
amyl butyrate;
2-(n-pentyl)-thiazole;
2-(i-butyl)-thiazole;
2-(i-propyl)-thiazole;
2-(n-propyl)-thiazole;
the dimethyl acetal of 2-phenyl-4-pentenal;
methional;
4-methylthiobutanal;
2-ethyl-3-acetyl pyrazine;
tetramethyl pyrazine;
2-methyl pyrazine;
2-trans hexenal;
maltol;
2-phenyl-4-pentenal;
2-phenyl-4-pentenal dimethyl acetal; and
2-phenyl-4-pentenal diethyl acetal.

The following examples are intended to illustrate the instant invention. It will be understood that these examples are illustrative and that the invention is to be considered restricted thereto only as indicated in the appended claims.

All parts and percentages given herein are by weight unless otherwise specified.

EXAMPLE I

REACTION OF 2,4-DECANEDIONE WITH EPICHLOROHYDRIN

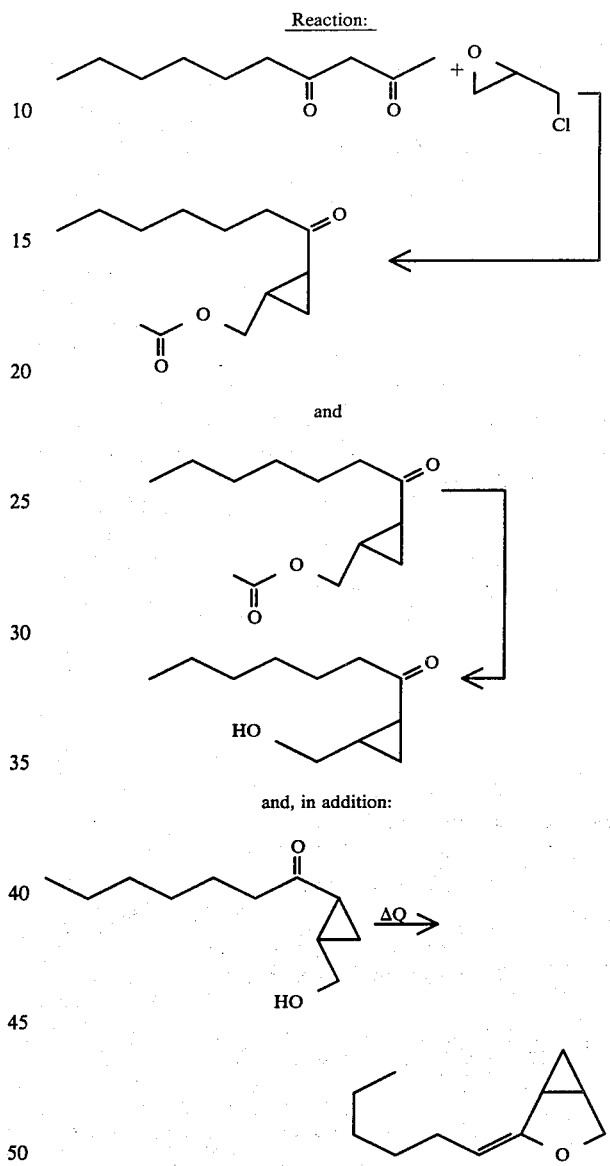

Into a 1-liter reaction flask equipped with stirrer, reflux condenser, thermometer, addition funnel and nitrogen atmosphere blanket apparatus and Bidwell trap is placed 240 ml isopropyl alcohol. With stirring, 130 grams (2.4 moles) of sodium methoxide is added to the reaction mass while maintaining the reaction mass temperature at 24°–42° C. An additional 100 ml of isopropyl alcohol is then added and the reaction mass is heated to reflux. While refluxing and over a period of 1 hour, at a temperature of 78°–93° C., 204 grams (1.2 moles) of 2,4-decanedione is added to the reaction mass.

While maintaining the reaction mass at 66°–80° C. over a period of 1 hour, 111 grams (1.2 moles) of epichlorohydrin is added to the reaction mass. The reaction mass with stirring is then heated for a period of 3 hours at 66°–80° C. During the addition of the epichlorohydrin, the reaction product is trapped in the Bidwell trap.

The reaction mass is then quenched with 15% aqueous hydrochloric acid, then washed with one 500 ml portion of water followed by four 500 ml portions of saturated sodium chloride.

FIG. 1 is the GLC profile for the resulting reaction product. (Conditions: 6'×0.25" 10% SF-96 column programmed at 100°–220° C. at 8° C. per minute). The peak indicated by reference numeral "10" is the peak for the side product having the structure:

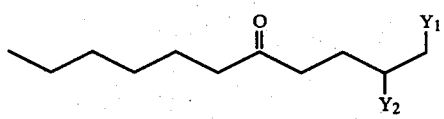

wherein $Y_1$ and $Y_2$ are the same or different and each represents chloro or hydroxyl. The peak indicated by reference numeral "11" is the peak for the actual product having the structure:

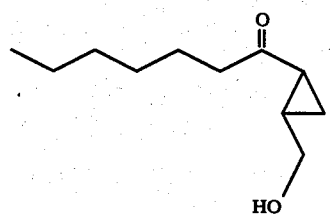

A portion of the reaction product is distilled on a spinning band column. Fraction 12 of the distillation product is analyzed via GLC (conditions: 10% SF-96 8'×¼" column programmed at 100°–220° C. at 8° C. per minute). FIG. 1A is the GLC profile for this distillation product. The peak indicated by reference numeral "12" is the peak for the compound having the structure:

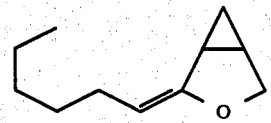

The peak indicated by reference numeral "13" is the peak for the compound having the structure:

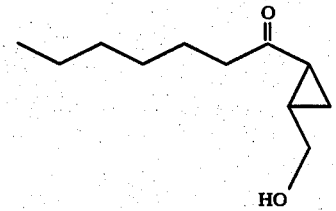

FIG. 2 is the NMR spectrum for the compound of peak 10 of FIG. 1 containing the compound having the structure:

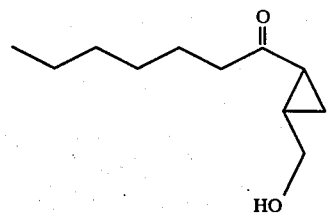

(Solvent: $CFCl_3$; Field strength: 100 MHz).

FIG. 3 is the infra-red spectrum for the peak indicated by reference numeral "10" of FIG. 1 for the compound having the structure:

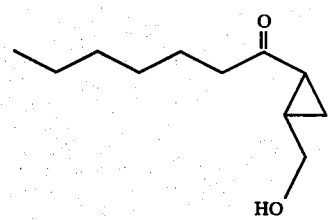

FIG. 3A is the NMR spectrum for the peak indicated by reference numeral "12" on FIG. 1A, having the structure:

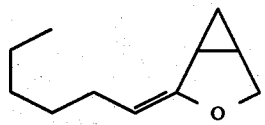

(Solvent: $CFCl_3$; Field strength: 100 MHz).

FIG. 3B is the infra-red spectrum for the peak indicated by reference numeral "12" on FIG. 1A for the compound having the structure:

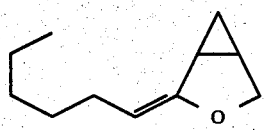

EXAMPLE II

REACTION OF DIMETHYL CARBONATE AND ALCOHOL OF EXAMPLE I

Reaction:

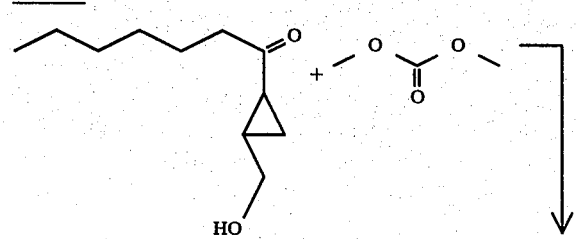

-continued

Reaction:

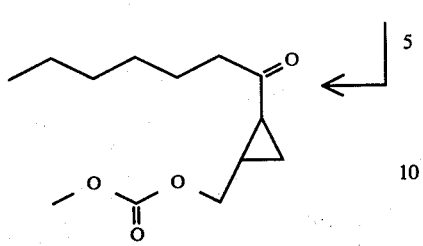

Into a 1 liter reaction flask equipped with addition funnel, heating mantle, nitrogen blanket apparatus and Bidwell trap is placed 38.6 grams (0.7 moles) of sodium methoxide and 126 grams (1.4 moles) of dimethyl carbonate. The resulting mixture is heated to reflux and while refluxing at a temperature of between 69° and 86° C., over a period of 1 hour, the alcohol produced according to Example I having the structure:

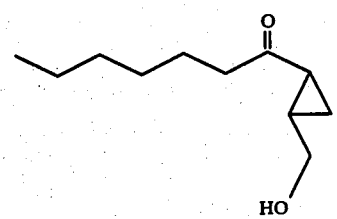

is added to the reaction mass, dropwise (while taking off methyl alcohol using the Bidwell trap). The reaction mass is then continued to be refluxed for 15 minutes. At the end of the 15 minute period, 126 grams of new dimethyl carbonate is added to the reaction mass and additional methyl alcohol is removed via the Bidwell trap. The reaction mass is then heated for an additional 5 hours at 79°-86° C.

At the end of the reaction, the reaction mass is quenched with 17% aqueous hydrochloric acid to a pH of 2. The reaction mass is then washed with water to a neutral pH and then washed with three 500 ml volumes of water.

The resulting product has the structure:

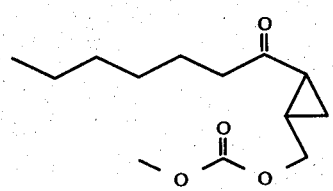

FIG. 4 is the GLC profile for the reaction product (conditions: 10% SF-96 column, 6'×0.25" programmed at 100°-220° C. at 8° C. per minute). The peak indicated by reference numeral "40" is the peak for the compound defined according to the structure:

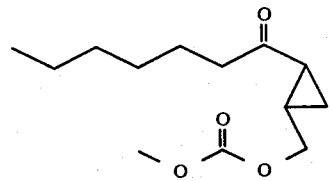

FIG. 5 is the NMR spectrum for the peak indicated by reference numeral "40" of FIG. 4 for the compound having the structure:

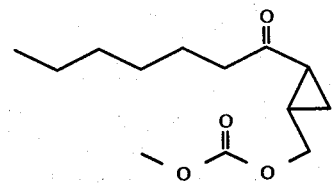

(Solvent: CFCl₃; Field strength: 100 MHz).

FIG. 6 is the infra-red spectrum for the peak indicated by reference numeral "40" of FIG. 4 for the compound having the structure:

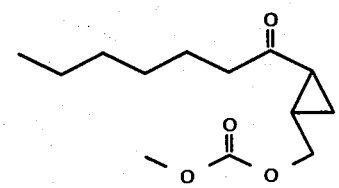

EXAMPLE III

PREPARATION OF ACETIC ACID ESTER "INTERMEDIATE"

Reaction:

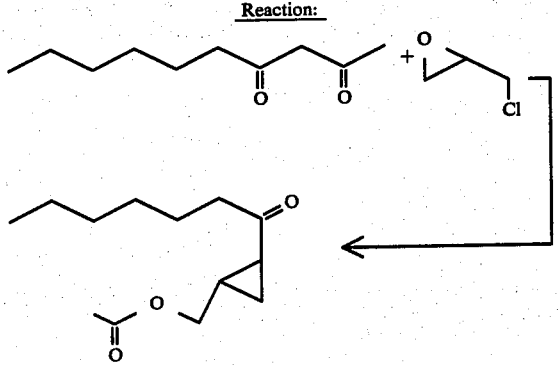

Into a 1 liter reaction flask equipped with stirrer, reflux condenser, addition funnel, Bidwell trap and nitrogen atmosphere blanket apparatus is placed 250 ml toluene and 130 grams of sodium methoxide (2.4 moles). The reaction mass is heated to reflux and while refluxing and maintaining the temperature at 92°-117° C. over a period of 1.5 hours, 2,4-decanedione (217 grams; 1.2 moles) is added to the reaction mass.

Then, over a period of 1.5 hours while maintaining the temperature at 103°-117° C. with stirring, 111 grams (1.2 moles) of epichlorohydrin is added to the reaction mass. The reaction mass is then heated for an additional 4 hours at 110°–113° C. while removing water of reaction via the Bidwell trap.

The reaction mass is then quenched with 37% hydrochloric acid to a pH of 2. The reaction mass is then transferred to a separatory funnel and washed with 3 one-liter portions of water followed by one 1-liter portion of saturated sodium chloride solution.

The resulting product is then distilled on a 2" Splash column packed with stones yielding the following fractions:

| Fraction Number | Vapor Temp. (°C.) | Liquid Temp. (°C.) | Pressure mm/Hg. | Weight of Fraction (grams) |
|---|---|---|---|---|
| 1 | 35/57 | 44/77 | 10/10 | 853 |
| 2 | 75 | 127 | 53 | 364 |
| 3 | 75 | 118 | 6 | 35 |
| 4 | 130 | 173 | 3 | 362 |
| 5 | 54 | 220 | 3 | 189 |

Fractions 4 and 5 of the 2" Splash column distillation are bulked and re-distilled on a 1' Goodloe column (1" in diameter) yielding the following fractions:

| Fraction Number | Vapor Temp. (°C.) | Liquid Temp. (°C.) | Pressure mm/Hg | Weight of Fraction (grams) |
|---|---|---|---|---|
| 1 | 50/95 | 101/144 | 76/5 | 43.0 |
| 2 | 88 | 136 | 22 | 3.0 |
| 3 | 81/92 | 124/142 | 11/1 | 19.5 |
| 4 | 97 | 144 | 1 | 19.5 |
| 5 | 101 | 148 | 1 | 18.5 |
| 6 | 108 | 152 | 1 | 21.5 |
| 7 | 110 | 155 | 1 | 43.0 |
| 8 | 100 | 168 | 1 | 50.0 |
| 9 | 143 | 200 | 1 | 52.5 |
| 10 | 127/118 | 108/20 | 0.8/0.7 | — |
| 11 | 145 | 225 | 0.7 | — |
| 12 | 146 | 240 | 0.7 | 22.0 |

The resulting reaction product has the structure:

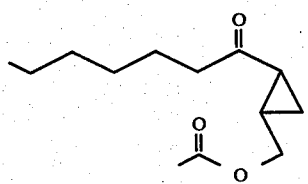

FIG. 7 is the GLC profile for the reaction product (conditions: 6'×0.25" 10% SF-96 column programmed at 100°–220° C. at 8° C. per minute). The peak indicated by reference numeral "70" is the peak for the reaction product having the structure:

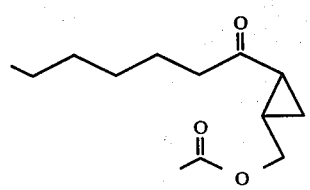

FIG. 8 is the NMR spectrum for the compound having the structure:

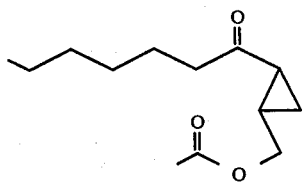

of the peak indicated by reference numeral "70" of FIG. 7 (Solvent: CFCl$_3$; Field strength: 100 MHz).

FIG. 9 is the infra-red spectrum for the peak indicated by reference numeral "70" of FIG. 7 for the compound having the structure:

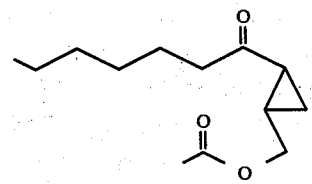

EXAMPLE IV

JASMINE PERFUME FORMULATIONS

The following mixtures are prepared:

| Ingredients | Parts by Weight | | |
|---|---|---|---|
| | Example IV (A) | Example IV (B) | Example IV (C) |
| Para cresol | 1 | 1 | 1 |
| Acetyl methyl anthranilate | 20 | 20 | 20 |
| Farnesol | 4 | 4 | 4 |
| Cis-3-hexenyl benzoate | 30 | 30 | 30 |
| Nerolidol | 30 | 30 | 30 |
| Indol | 15 | 15 | 15 |
| Eugenol | 20 | 20 | 20 |
| Benzyl alcohol | 40 | 40 | 40 |
| Methyl linoleate | 40 | 40 | 40 |
| Jasmine lactone | 20 | 20 | 20 |
| Dihydromethyl jasmonate | 10 | 10 | 10 |
| Linalool | 150 | 150 | 150 |
| Benzyl acetate | 400 | 400 | 400 |
| Abietyl alcohol | 150 | 150 | 150 |
| Compound prepared according to Example I having the structure: | 20 | 0 | 0 |

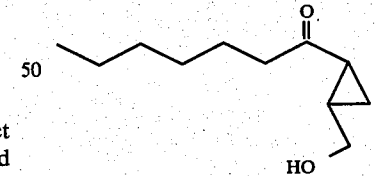

| Compound prepared according to Example II having the structure: | 0 | 20 | 0 |

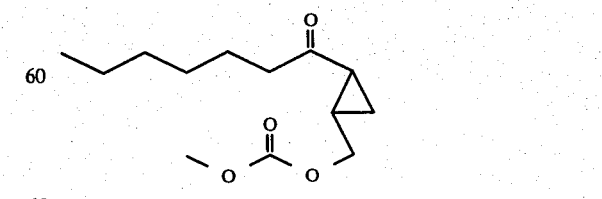

| Compound prepared according to Example III having the structure: | 0 | 0 | 20 |

-continued

| Ingredients | Parts by Weight | | |
|---|---|---|---|
| | Example IV (A) | Example IV (B) | Example IV (C) |
| 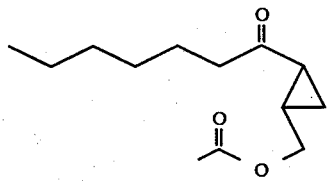 | | | |

Each of the 1-hydroxymethyl-2-acyl cyclopropane derivatives having the structures:

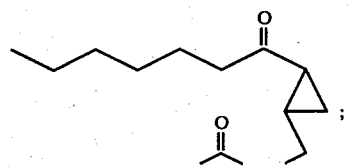

;

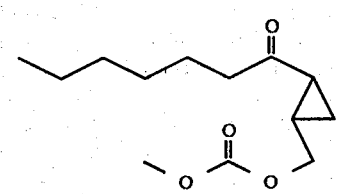

and

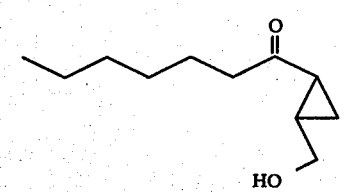

contributes an intense, natural jasmine-like nuance to this jasmine formulation. The compound having the structure:

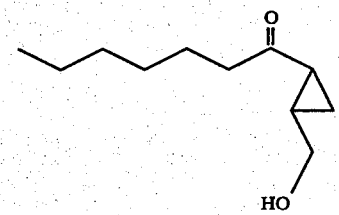

contributes a woody, jasmine-like, floral, green, fruity, leathery and pineapple-like aroma nuance.

The compound having the structure:

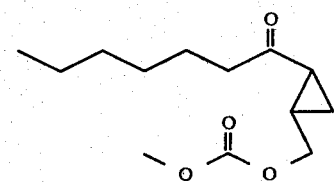

contributes to this jasmine formulation a floral, jasmine, fruity, sweet, grapefruit-like, leathery and coconut-like aroma profile.

The compound having the structure:

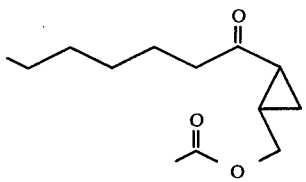

imparts to this jasmine formulation an interesting floral, green, fruity, mushroom-like aroma with anisic undertones.

The combination of cis-jasmone and normethyl jasmonate in ratios of from 1:9 up to 9:1 of cis-jasmone or normethyl jasmonate:one of the 1-hydroxymethyl-2-acyl cyclopropane derivatives of our invention imparts a very interesting natural jasmine aroma to this perfume formulation as well as other perfume formulations encompassed by our invention.

EXAMPLE V

PREPARATION OF COSMETIC POWDER COMPOSITIONS

Cosmetic powder compositions are prepared by mixing in a ball mill 100 grams of talcum powder with 0.25 grams of each of the substances set forth in Table II below. Each of the cosmetic powder compositions has an excellent aroma as described in Table II below.

TABLE II

| Substance | Aroma Description |
|---|---|
| | A woody, jasmine, floral, green, fruity, leathery, herbaceous, pineapple-like aroma profile. |
| | A floral, jasmine, fruity, sweet, grapefruit-like, leathery and coconut-like aroma profile. |
| | A floral, (jasmine-like), green, fruity, mushroom-like aroma profile with intense mushroom-like and anisic-like undertones. |
| | A floral, jasmine-like aroma. |
| Perfume composition of Example IV (A) | An intense jasmine aroma with pleasant woody, floral, green, fruity, leathery and pineapple-like |

TABLE II-continued

| Substance | Aroma Description |
|---|---|
| | undertones. |
| Perfume composition of Example IV (B) | A jasmine aroma with floral, fruity, sweet, grapefruit-like, leathery and coconut-like undertones |
| Perfume composition of Example IV (C) | A jasmine aroma with floral, mushroom-like, green, fruity and anisic-like undertones. |

EXAMPLE VI

PERFUMED LIQUID DETERGENTS

Concentrated liquid detergents (Lysine salt of n-dodecylbenzene sulfonic acid as more specifically described in U.S. Pat. No. 3,948,818, issued on Apr. 6, 1976 incorporated by reference herein) with aroma nuances as set forth in Table II of Example V, are prepared containing 0.10%, 0.15%, 0.20%, 0.25%, 0.30% and 0.35% of the substance set forth in Table II of Example V. They are prepared by adding and homogeneously mixing the appropriate quantity of substance set forth in Table II of Example V in the liquid detergent. The detergents all possess excellent aromas as set forth in Table II of Example V, the intensity increasing with greater concentrations of substance as set forth in Table II of Example V.

EXAMPLE VII

PREPARATION OF COLOGNES AND HANDKERCHIEF PERFUMES

Compositions as set forth in Table II of Example V are incorporated into colognes at concentrations of 2.0%, 2.5%, 3.0%, 3.5%, 4.0%, 4.5% and 5.0% in 80%, 85%, 90% and 95% aqueous food grade ethanol solutions; and into handkerchief perfumes at concentrations of 15%, 20%, 25% and 30% (in 80%, 85%, 90% and 95% aqueous food grade ethanol solutions). Distinctive and definitive fragrances as set forth in Table II of Example V are imparted to the colognes and to the handkerchief perfumes at all levels indicated.

EXAMPLE VIII

PREPARATION OF SOAP COMPOSITIONS

One hundred grams of soap chips (per sample) (IVORY ® produced by the Procter & Gamble Company of Cincinnati, Ohio), are each mixed with one gram samples of substances as set forth in Table II of Example V until homogeneous compositions are obtained. In each of the cases, the homogeneous compositions are heated under 8 atmospheres pressure at 180° C. for a period of three hours and the resulting liquids are placed into soap molds. The resulting soap cakes, on cooling, manifest aromas as set forth in Table II of Example V.

EXAMPLE IX

PREPARATION OF SOLID DETERGENT COMPOSITIONS

Detergents are prepared using the following ingredients according to Example I of Canadian Pat. No. 1,007,948 (incorporated by reference herein):

| Ingredient | Percent by Weight |
|---|---|
| "Neodol ® 45-11" (a $C_{14}$-$C_{15}$ alcohol ethoxylated with 11 moles of ethylene oxide) | 12 |
| Sodium carbonate | 55 |
| Sodium citrate | 20 |
| Sodium sulfate, water brighteners | q.s. |

This detergent is a phosphate-free detergent. Samples of 100 grams each of this detergent are admixed with 0.10, 0.15, 0.20 and 0.25 grams of each of the substances as set forth in Table II of Example V. Each of the detergent samples has an excellent aroma as indicated in Table II of Example V.

EXAMPLE X

Utilizing the procedure of Example I at column 15 of U.S. Pat. No. 3,632,396 (the disclosure of which is incorporated herein by reference), nonwoven cloth substrates useful as drier-added fabric softening articles of manufacture are prepared wherein the substrate, the substrate coating, the outer coating and the perfuming material are as follows:

1. A water "dissolvable" paper ("Dissolvo Paper")
2. Adogen 448 (m.p. about 140° F.) as the substrate coating; and
3. An outer coating having the following formulation (m.p. about 150° F.):
   57% $C_{20-22}$ HAPS
   22% isopropyl alcohol
   20% antistatic agent
   1% of one of the substances as set forth in Table II of Example V, supra.

Fabric softening compositions prepared according to Example I at column 15 of U.S. Pat. No. 3,632,396 having aroma characteristics as set forth in Table II of Example V, supra, consist of a substrate coating having a weight of about 3 grams per 100 square inches of substrate; a first coating located directly on the substrate coating consisting of about 1.85 grams per 100 square inches of substrate; and an outer coating coated on the first coating consisting of about 1.4 grams per 100 square inches of substrate. One of the substances of Table II of Example V, supra, is admixed in each case with the outer coating mixture, thereby providing a total aromatized outer coating weight ratio to substrate of about 0.5:1 by weight of the substrate. The aroma characteristics are imparted in a pleasant manner to the head space in a dryer on operation thereof in each case using said dryer-added fabric softener non-woven fabric and these aroma characteristics are described in Table II of Example V, supra.

EXAMPLE XI

HAIR SPRAY FORMULATIONS

The following hair spray formulation is prepared by first dissolving PVP/VA E-735 copolymer manufactured by the GAF Corporation of 140 West 51st Street, New York, N.Y., in 91.62 grams of 95% food grade ethanol. 8.0 grams of the polymer is dissolved in the alcohol. The following ingredients are added to the PVP/VA alcoholic solution:

| | |
|---|---|
| Dioctyl sebacate | 0.05 weight percent |
| Benzeyl alcohol | 0.10 weight percent |

| | | |
|---|---|---|
| Dow Corning 473 fluid prepared by the Dow Corning Corporation | 0.10 weight percent | |
| Tween 20 surfactant prepared by ICI America Corporation | 0.03 weight percent | |
| One of the perfumery substances as set forth in Table II of Example V, supra | 0.10 weight percent | |

The perfuming substances as set forth in Table II of Example V, supra, add aroma characteristics as set forth in Table II of Example V, supra, which are rather intense and esthetically pleasing to the users of the soft-feel, good-hold pump hair sprays.

EXAMPLE XII

CONDITIONING SHAMPOOS

Monamid CMA (prepared by the Mona Industries Company) (3.0 weight percent) is melted with 2.0 weight percent coconut fatty acid (prepared by Procter & Gamble Company of Cincinnati, Ohio); 1.0 weight percent ethylene glycol distearate (prepared by the Armak Corporation) and triethanolamine (a product of Union Carbide Corporation) (1.4 weight percent). The resulting melt is admixed with Stepanol WAT produced by the Stepan Chemical Company (35.0 weight percent). The resulting mixture is heated to 60° C. and mixed until a clear solution is obtained (at 60° C.). This material is "COMPOSITION A".

Gafquat ®755N polymer (manufactured by GAF Corporation of 140 West 51st Street, New York, N.Y.) (5.0 weight percent) is admixed with 0.1 weight percent sodium sulfite and 1.4 weight percent polyethylene glycol 6000 disterate produced by Armak Corporation. This material is "COMPOSITION B".

The resulting COMPOSITION A and COMPOSITION B are then mixed in a 50:50 wt ratio of A:B and cooled to 45° C. and 0.3 wt percent of perfuming substance as set forth in Table II of Example V added to the mixture. The resulting mixture is cooled to 40° C. and blending is carried out for an additional one hour in each case. At the end of this blending period, the resulting material has a pleasant fragrance as indicated in Table II of Example V.

EXAMPLE XIII

GRAPEFRUIT FORMULATION

The following formulation is prepared:

| Ingredients | Parts by Weight |
|---|---|
| Grapefruit oil | 92.0 |
| Bergamot oil | 2.0 |
| Citral | 3.0 |
| Amyl alcohol | 1.0 |
| Ethyl acetate | 1.0 |
| 5-Phenyl-4-pentenal | 1.0 |
| 3-Mercapto-4-heptanol | 0.5 |

Compound having the structure:

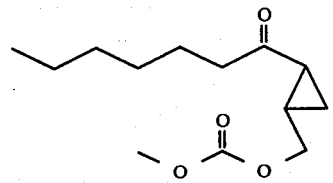

prepared according to Example II—0.5.

When the above grapefruit formulation is added to water at the rate of 1%, an excellent grapefruit drink is prepared. The compound having the structure:

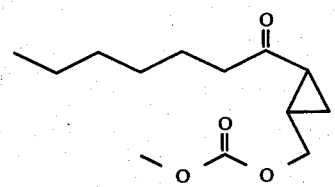

prepared according to Example II given an intense, citrusy note to the instant formulation with pleasant, coconut-like nuances thereby rendering it more desirable and tropical fruitlike. The effect rendered by the compound having the structure:

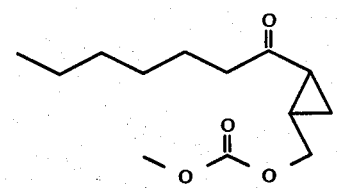

is enhanced by adding 0.02 parts by weight of the compound having the structure:

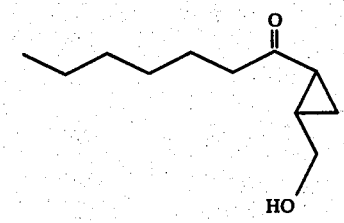

which imparts a pleasant pineapple-like nuance to this formulation.

EXAMPLE XIV

VEGETABLE FLAVOR FORMULATION

The compound having the structure:

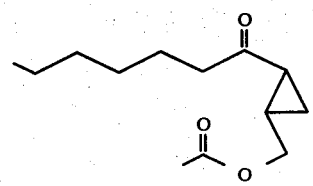

is added directly to a food product prior to processing and canning. The following illustrates the beneficial flavor effect when the compound having the structure:

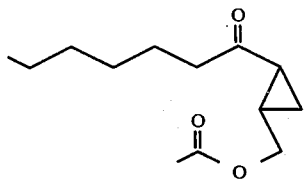

prepared according to Example III is added directly to several products just prior to their consumption:
  i. blended vegetable sauce containing mushrooms at approximately 30 ppm, brings out the boiled mushroom nuances.
  ii. in vegetable soup at 40 ppm, imparts a fresh vegetable flavor with mushroom nuances. The green notes give the entire vegetable flavor a fuller body.
  iii. in bean tomato sauce at approximately 20 ppm, modifies the flavor by reducing the harsh character of the tomato space mixture while at the same time adding green fresh notes and developing the "cooked" tomato note to a "fresh" tomato note. Also adds mushroom nuances to the sauce.

EXAMPLE XV

VEGETARIAN VEGETABLE SOUP

The compound defined according to the structure:

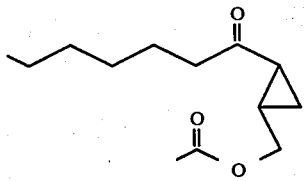

is added at the rate of 2 ppm to condensed vegetarian vegetable soup (Shop Rite²⁰⁰ brand). One liter of water is added to one liter of soup and thoroughly admixed. The resulting mixture is then simmered (200° F.) for a period of 10 minutes. The resulting soup is compared by a bench panel with a soup which has no compound defined according to the structure:

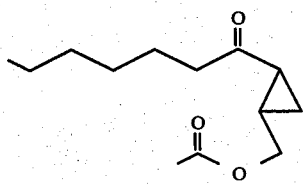

added thereto. The soup containing the compound having the structure:

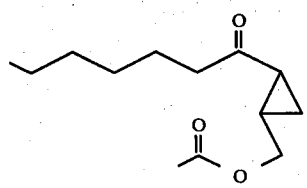

added thereto is unanimously preferred as having a more vegetable-like taste with mushroom nuances with fuller mouth feel and better aroma and, in addition, a pleasant slight, green nuance.

EXAMPLE XVI

A. Powder Form

Twenty grams of the flavor composition of Example XIII which flavor composition contains the compound having the structure:

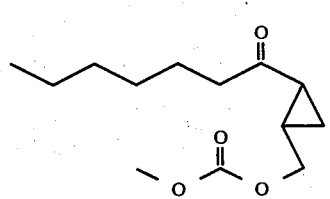

is emulsified in a solution containing 300 grams gum acacia with 700 grams of water. The emulsion is spray-dried with a Bowen Lab Model drier utilizing 250 c.f.m. of air with an inlet temperature of 500° F. and outlet temperature of 200° F. and a wheel speed of 50,000 r.p.m.

B. Paste Blend

The following mixture is then prepared:

| Ingredients | Parts by Weight |
|---|---|
| Liquid flavor composition of Example XIII | 48.4 |
| Cab-O-Sil M-5 (Brand of silica produced by the Cabot Corporation of 125 High Street, Boston, Mass. 02110); Physical properties: Surface area: 200 m²/gm. Nominal particle size: 0.012 microns Density: ⅜ lbs/cu. ft. | 3.2 |

The Cab-O-Sil is dispersed in the liquid flavor composition with vigorous stirring, thereby resulting in a viscous liquid. 48.4 parts by weight of the powder flavor composition prepared in Part A is then blended into said viscous liquid, with stirring at 25° C. for a period of 30 minutes, resulting in a thixotropic sustained release flavor paste.

EXAMPLE XVII

CHEWING GUM 100 parts by weight of chicle are mixed with 4 parts by weight of the flavor prepared in accordance with Example XVI. 300 parts of sucrose and 100 parts of corn syrup are added. Mixing is effected in a ribbon blender with jacketed side walls of the type manufactured by the Banker Perkins Co.

The resultant chewing gum blend is then manufactured into strips 1 inch in width and 0.1 inches in thickness. The strips are cut into lengths of 3 inches each. On chewing, the chewing gum has a pleasant long-lasting grapefruit flavor.

EXAMPLE XVIII

TOOTHPASTE FORMULATION

The following separate groups of ingredients are prepared:

| Group "A" |
|---|

| | | |
|---|---|---|
| | -continued | |
| 30.200 | Glycerine | |
| 15.325 | Distilled water | |
| 0.100 | Sodium benzoate | |
| 0.125 | Saccharin sodium | |
| 0.400 | Stannous fluoride | |
| Group "B" | | |
| 12.500 | Calcium carbonate | |
| 37.200 | Dicalcium phosphate (dihydrate) | |
| Group "C" | | |
| 2.000 | Sodium n-lauroyl sarcosinate (foaming agent) | |
| Group "D" | | |
| 1.200 | Flavor material of XVI | |
| 100.000 | Total | |

Procedure:
1. To ingredients in Group "A" are stirred and heated in a steam jacketed kettle to 160° F.
2. Stirring is continued for an additional three to five minutes to form a homogeneous gel.
3. The powders of Group "B" are added to the gel, while mixing until a homogeneous paste is formed.
4. With stirring, the flavor of "D" is added and lastly, the sodium n-lauroyl sarcosinate.
5. The resultant slurry is then blended for one hour. The completed paste is then transferred to a three roller mill and then homogenized, and finally tubed.

The resulting toothpaste when used in a normal toothbrushing procedure yields a pleasant graepfruit flavor of constant strong intensity throughout said procedure (1–1.5 minutes).

EXAMPLE XIX

CHEWABLE VITAMIN TABLETS

The flavor material produced according to the process of Example XVI is added to a chewable vitamin tablet formulation at a rate of 5 gm/kg which chewable vitamin tablet formulation is prepared as follows:

| Ingredients | Gms/1000 Tablets |
|---|---|
| Vitamin C (ascorbic acid) as ascorbic acid solution mixture 1:1 | 70.000 |
| Vitamin B$_1$ (thiamine mononitrate) as Rocoat ® thiamine mononitrate 33% (Hoffman LaRoche) | 4.000 |
| Vitamin B$_2$ (riboflavin) as Rocoat ® riboflavin 33⅓% | 5.000 |
| Vitamin B$_6$ (pyridoxine hydrochloride) as Rocoat ® pyridoxide hydrochloride 33⅓% | 4.000 |
| Niacinamide as Rocoat ® niacinamide 33⅓% | 33.000 |
| Calcium pantothenate | 11.500 |
| Vitamin B$_{12}$ (cyanocobalamin) as Merck 0.1% in gelatin | 3.500 |
| Vitamin E (dl-alpha tocophenyl acetate as dry Vitamin E acetate 33⅓% Roche | 6.600 |
| d-Biotin | 0.044 |
| Certified lake color | 5.000 |
| Flavor of Example XVI | 5.000 |
| Sweetener-sodium saccharin | 1.000 |
| Magnesium stearate lubricant | 10.000 |
| Mannitol q.s. to make | 500.000 |

Preliminary tablets are prepared by slugging with flat faced punches and grinding the slugs to 14 mesh. 13.5 grams dry Vitamin A acetate and 0.6 grams Vitamin D are then added as beadlets. The entire blend is then compressed using concave punches at 0.5 grams each.

Chewing of the resultant tablet yields a pleasant, longlasting, consistently strong grapefruit flavor for a period of 12 minutes.

EXAMPLE XX

GUAVA NECTAR FORMULATION

To commercial guava nectar at the rate of 0.2 ppm is added the compound having the structure:

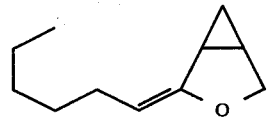

prepared according to Example I. The compound having the structure:

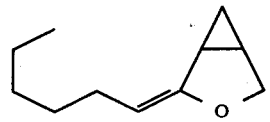

adds to the guava nectar a very natural tropical fruit aroma and taste nuance which causes it to be reminiscent of fresh guava.

What is claimed is:
1. A process for augmenting or enhancing the aroma or taste of a foodstuff comprising the step of adding to said foodstuff from 0.02 ppm up to about 50 ppm based on the foodstuff composition of a compound having the structure:

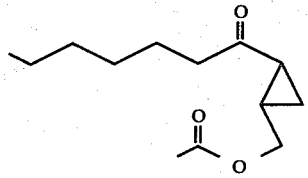

* * * * *